(12) United States Patent
Ibrahim et al.

(10) Patent No.: US 12,009,961 B2
(45) Date of Patent: *Jun. 11, 2024

(54) SYSTEM AND METHOD FOR PREAMBLE DETECTION IN MIMO NARROWBAND POWER LINE COMMUNICATIONS

(71) Applicant: TEXAS INSTRUMENTS INCORPORATED, Dallas, TX (US)

(72) Inventors: Mostafa Sayed Ibrahim, Dallas, TX (US); Il Han Kim, Allen, TX (US); Tarkesh Pande, Richardson, TX (US); Anuj Batra, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,607

(22) Filed: Jan. 6, 2021

(65) Prior Publication Data

US 2021/0160119 A1 May 27, 2021

Related U.S. Application Data

(63) Continuation of application No. 15/206,489, filed on Jul. 11, 2016, now Pat. No. 10,917,279, which is a
(Continued)

(51) Int. Cl.
*H04L 27/26* (2006.01)
*H04B 3/54* (2006.01)
(Continued)

(52) U.S. Cl.
CPC .......... *H04L 27/2656* (2013.01); *H04B 3/54* (2013.01); *H04B 3/542* (2013.01); *H04B 3/546* (2013.01);
(Continued)

(58) Field of Classification Search
CPC .......... H04B 3/54; H04B 3/542; H04B 3/546; H04B 7/0413; H04L 27/2647;
(Continued)

(56) References Cited

U.S. PATENT DOCUMENTS 7,697,617 B2   4/2010   Ray
7,826,567 B2   11/2010  Gruijters
(Continued)

OTHER PUBLICATIONS

IEEE Transactions on Information Theory, vol. 45, No. 5, "Space-Time Block Codes from Orthogonal Designs;" Tarokh et al., Jul. 1999, pp. 1456-1467.
(Continued)

*Primary Examiner* — Betsy Deppe
(74) *Attorney, Agent, or Firm* — Mandy Barsilai Fernandez; Frank D. Cimino

(57) ABSTRACT

A PLC network system and method operative with OFDM for generating MIMO frames with suitable preamble portions configured to provide backward compatibility with legacy PLC devices and facilitate different receiver tasks such as frame detection and symbol timing, channel estimation and automatic gain control (AGC), including robust preamble detection in the presence of impulsive noise and frequency-selective channels of the PLC network. A PLC device may include a delayed correlation detector and a cross-correlation detector operating in concert to facilitate preamble detection in one implementation.

17 Claims, 22 Drawing Sheets

Related U.S. Application Data continuation of application No. 14/583,875, filed on Dec. 29, 2014, now Pat. No. 9,419,835.

(60) Provisional application No. 62/057,649, filed on Sep. 30, 2014, provisional application No. 62/057,661, filed on Sep. 30, 2014, provisional application No. 62/057,669, filed on Sep. 30, 2014.

(51) Int. Cl.
| | |
|---|---|
| *H04B 7/0413* | (2017.01) |
| *H04L 5/00* | (2006.01) |
| *H04L 7/04* | (2006.01) |
| *H04W 74/0816* | (2024.01) |
| *H04L 1/1867* | (2023.01) |

(52) U.S. Cl.
CPC ......... *H04B 7/0413* (2013.01); *H04L 5/0023* (2013.01); *H04L 7/042* (2013.01); *H04L 27/26* (2013.01); *H04L 27/2602* (2013.01); *H04L 27/2603* (2021.01); *H04L 27/2613* (2013.01); *H04L 27/2655* (2013.01); *H04L 27/2663* (2013.01); *H04W 74/0816* (2013.01); *H04L 1/188* (2013.01)

(58) Field of Classification Search
CPC ............. H04L 27/2649; H04L 27/2655; H04L 27/2656; H04L 27/2602; H04L 27/2663; H04L 27/2613; H04L 7/042; H04L 5/0023
See application file for complete search history.

(56) References Cited

U.S. PATENT DOCUMENTS

| | | | |
|---|---|---|---|
| 8,031,806 B2 | 10/2011 | Trachewsky | |
| 8,265,197 B2 | 9/2012 | Kim et al. | |
| 8,472,569 B2 | 6/2013 | Roh | |
| 8,559,569 B1 | 10/2013 | Zhou | |
| 8,792,567 B2 | 7/2014 | Dabak et al. | |
| 9,419,835 B2 * | 8/2016 | Ibrahim | .................. H04L 7/042 |
| 10,917,279 B2 * | 2/2021 | Ibrahim | .............. H04B 7/0413 |
| 2004/0170237 A1 | 9/2004 | Chadha | |
| 2007/0280098 A1 | 12/2007 | Bhatt | |
| 2012/0093198 A1 | 4/2012 | Dabak | |
| 2012/0320996 A1 * | 12/2012 | Dabak | ...................... H04B 3/54 |
| | | | 375/257 |
| 2013/0051320 A1 | 2/2013 | Pande et al. | |
| 2013/0259101 A1 | 10/2013 | Earnshaw | |
| 2013/0301744 A1 | 11/2013 | Stadelmeier et al. | |
| 2014/0112398 A1 | 4/2014 | Kamalizad et al. | |
| 2014/0126655 A1 | 5/2014 | Vijayasankar et al. | |

OTHER PUBLICATIONS

IEEE International Symposium on Power Line Communication and its Applications, "MIMO PLC: Theory, Measurements and System Setup;" Schwager et al., 2011, pp. 48-53.

"MIMO for Inhome Power Line Communications," Stadelmeier et al., 7th International ITG Conference on Source and Channel Coding, 2008, pp. 1-6.

Journal of Electrical and Computer Engineering, vol. 2013, Article ID 892628, "An Overview of the HomePlug AV2 Technology;" Yonge et al., Aug. 3, 2012, 21 pgs.

Journal of Electrical and Computer Engineering, vol. 2013, Article ID 712376, "Power Line Communications for Smart Grid Applications," Berger et al., Aug. 3, 2012, 17 pgs.

International Journal of Advanced Research in Computer Science and Software Engineering, vol. 3, Issue 3, "Channel Estimation in OFDM Systems," Pathak et al., Mar. 2013, pp. 312-327.

IEEE Standards Association, "IEEE Standard for Low-Frequency (less than 500 kHz) Narrowband Power Line Communications for Smart Grid Applications," Oct. 31, 2013, 269 pgs.

* cited by examiner

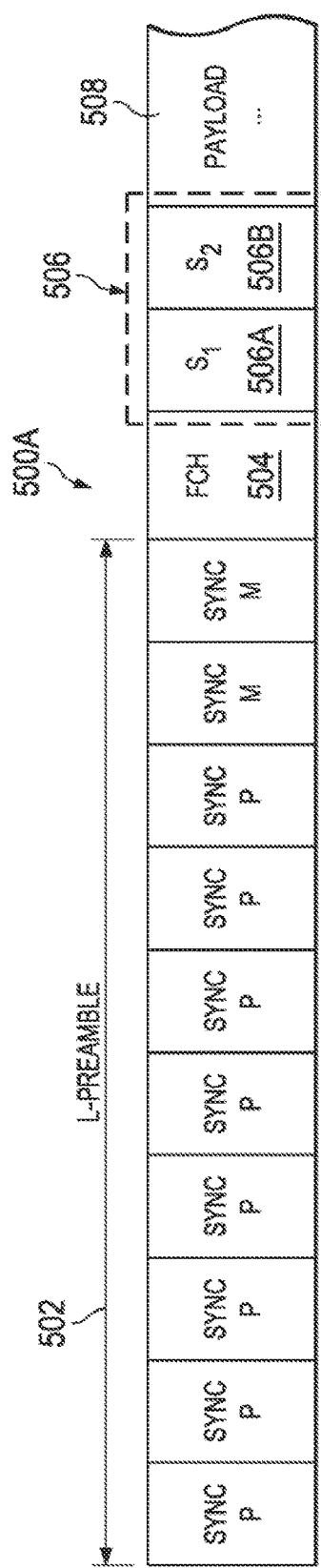
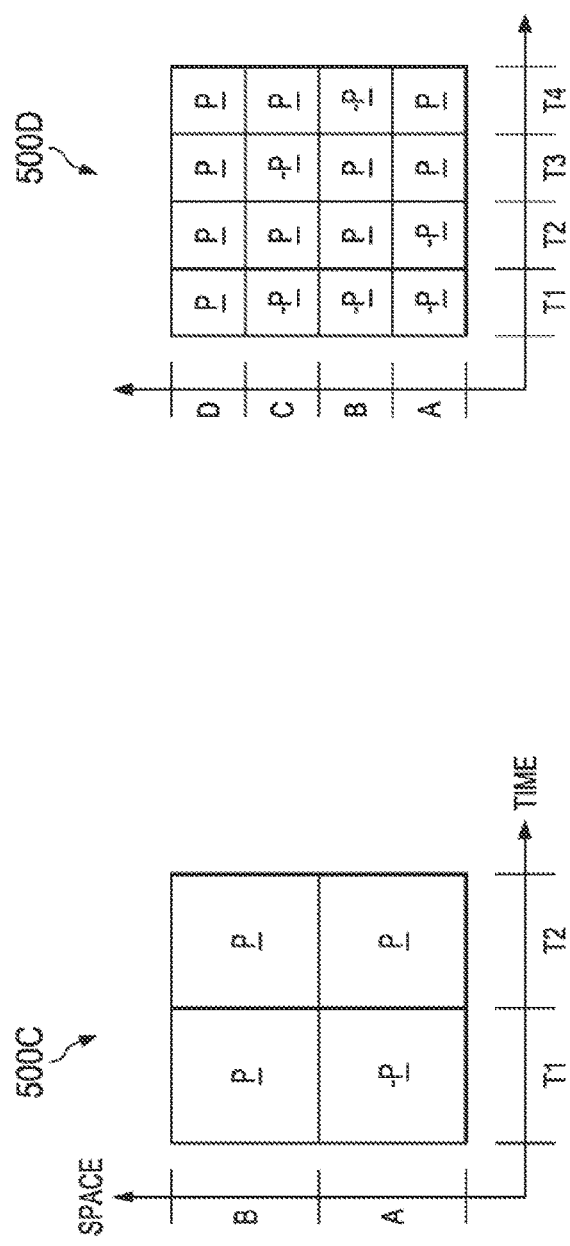
FIG. 5A
FIG. 5C
FIG. 5D

752 — IN A HYBRID OR MIXED-MODE MIMO PLC NETWORK (INCLUDING ONE OR MORE MIMO-COMPLIANT DEVICES AND ONE OR MORE LEGACY SISO DEVICES), AT A MIMO TRANSMITTER CONFIGURED TO OPERATE IN A MIMO PLC CHANNEL HAVING $N_T$ TRANSPORT PORTS (ALSO REFERRED TO AS TRANSMIT PHASES) AND $N_R$ RECEIVE PORTS, THE MIMO PLC CHANNEL ADAPTED TO TRANSFER DATA USING AN OFDM MODULATION SCHEME, IN A FRAME GENERATION PROCESS, GENERATING OR OTHERWISE PROVIDING AT A FIRST TRANSMIT PORT, A LEGACY PREAMBLE PORTION (L-PREAMBLE), e.g., COMPLIANT WITH IEEE 1901.2 STANDARD, AND A FIRST FCH PORTION INCLUDING LEGACY FCH DATA AND MIMO-COMPLIANT FCH DATA, FOLLOWED BY A FIRST M-PREAMBLE PORTION DATA COMPRISING A PLURALITY OF COMPONENTS (e.g., $N_T$ COMPONENTS), EACH INCLUDING A SYNCM ($S_1$) AND A SYNCP ($S_2$) SYMBOL HAVING CORRESPONDING GUARD INTERVALS (GI) AND/OR CYCLIC PREFIXES (CP), WHICH IS FOLLOWED BY A PAYLOAD DATA PORTION

754 — AT REMAINING TRANSMIT PORTS, GENERATING OR OTHERWISE PROVIDING L-PREAMBLE PORTIONS AND FCH PORTIONS THAT ARE CYCLIC-SHIFTED BY AN AMOUNT (CS-L) OR INTEGER MULTIPLE THEREOF FOLLOWED BY CORRESPONDING MIMO-COMPLIANT PREAMBLE PORTIONS THAT ARE FOLLOWED BY RESPECTIVE PAYLOAD DATA PORTIONS, WHICH ARE CYCLIC-SHIFTED BY CORRESPONDING AMOUNTS OF CS-M, WHEREIN THE OPERATIONS AT TRANSMIT PORTS ARE SUBSTANTIALLY SYNCHRONIZED WITH RESPECT TO GENERATING A MIMO FRAME

FIG. 7B

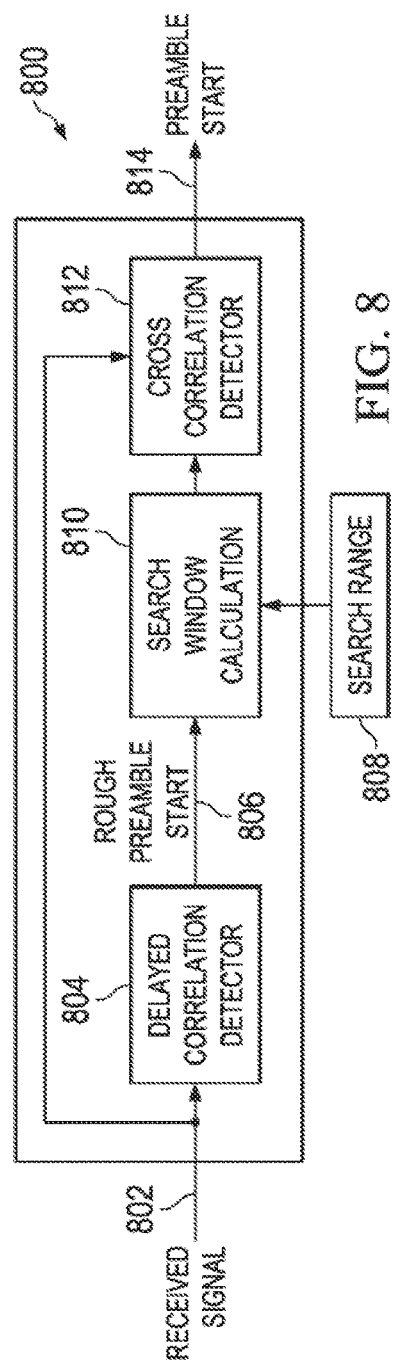
FIG. 8
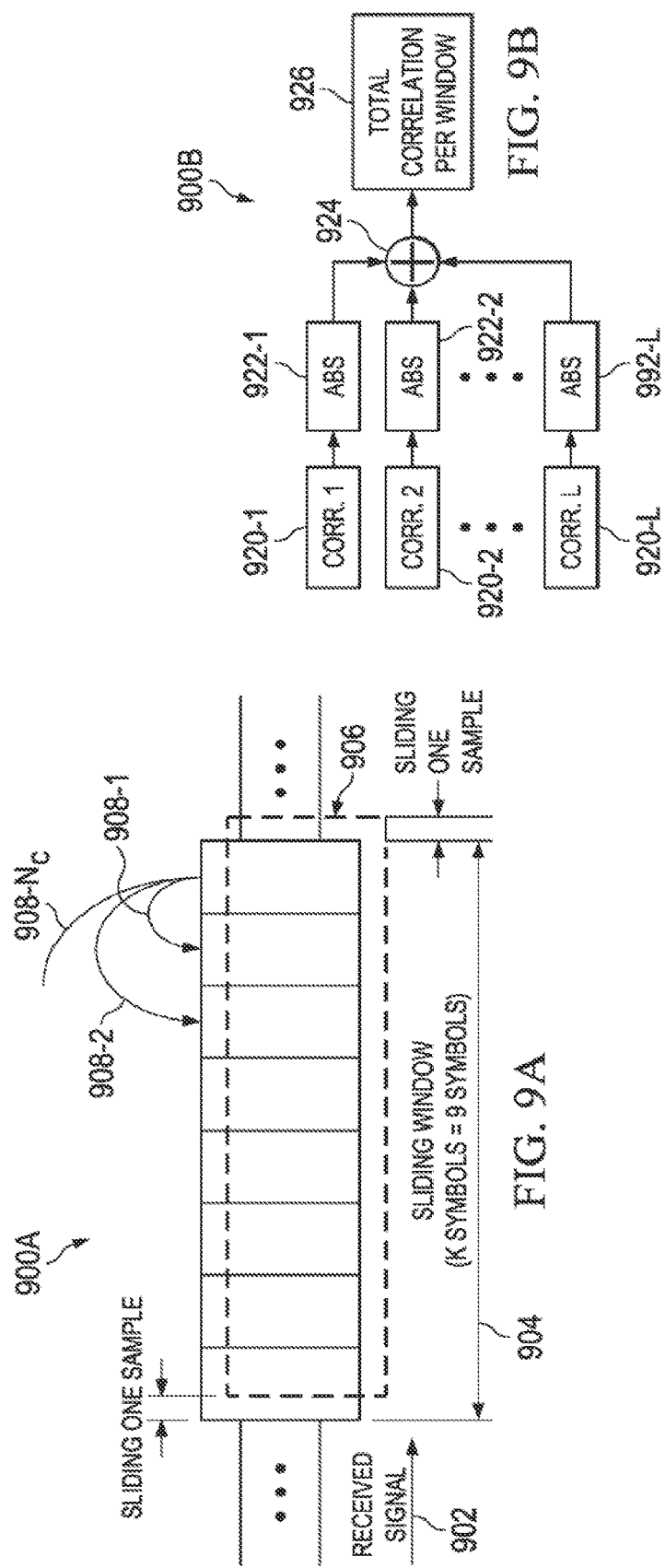
FIG. 9A
FIG. 9B

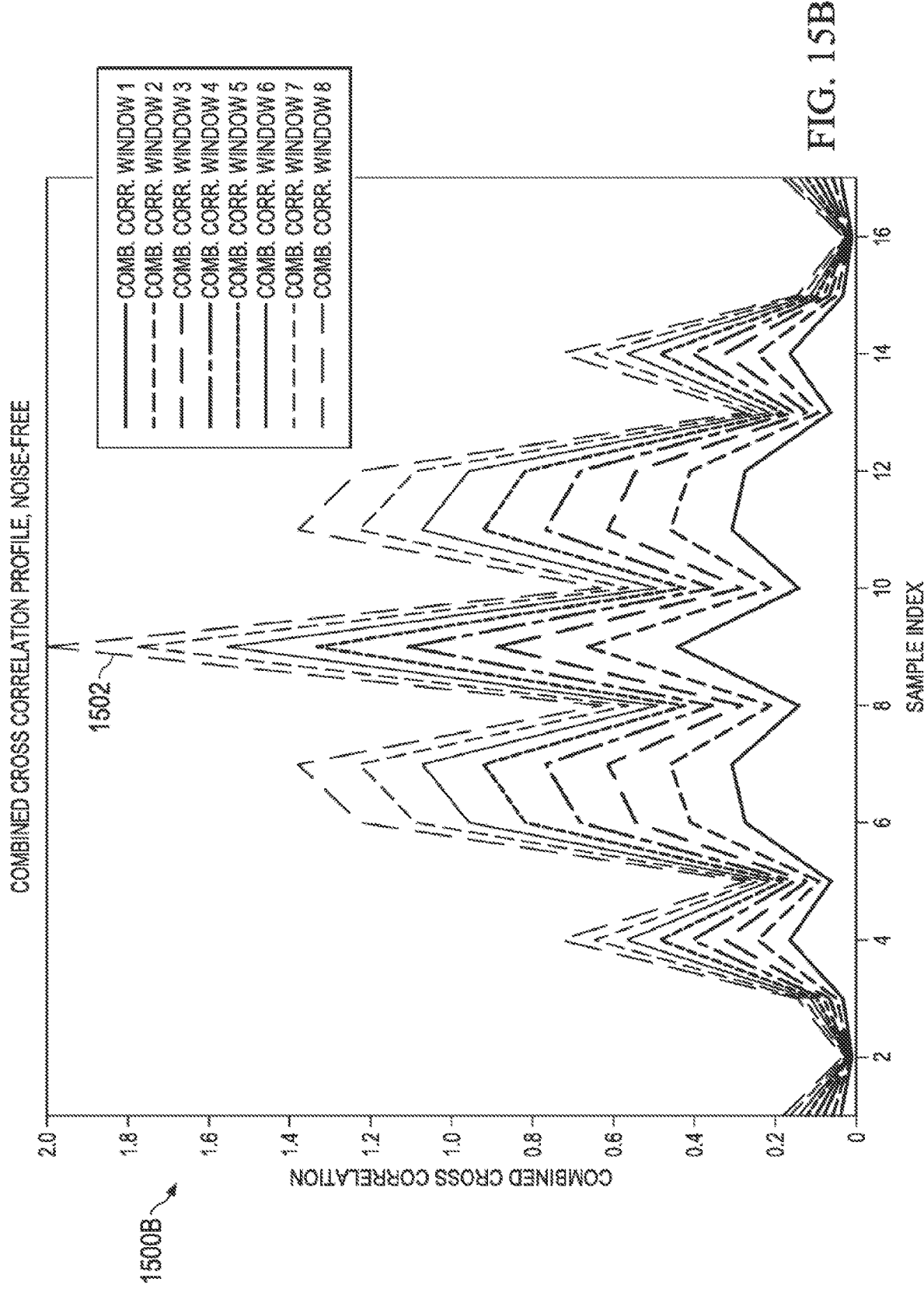

SYSTEM AND METHOD FOR PREAMBLE DETECTION IN MIMO NARROWBAND POWER LINE COMMUNICATIONS

CROSS-REFERENCE TO RELATED APPLICATIONS

This application is a continuation of U.S. patent application Ser. No. 15/206,489, filed Jul. 11, 2016, now U.S. Pat. No. 10,917,279, which claims priority to U.S. patent application Ser. No. 14/583,875, filed Dec. 29, 2014, now U.S. Pat. No. 9,419,835, which claims priority to and the benefit of U.S. Provisional Application Ser. No. 62/057,649, filed Sep. 30, 2014, U.S. Provisional Application Ser. No. 62/057,661, filed Sep. 30, 2014, and U.S. Provisional Application Ser. No. 62/057,669, filed Sep. 30, 2014, each of which is hereby incorporated by reference in their entirety.

FIELD OF THE DISCLOSURE

Disclosed embodiments relate generally to the field of communications including power line communications.

BACKGROUND

Power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name a few.

Narrowband power line communications (NB-PLC) operating in the 3-500 kHz frequency band has been gaining interest as a solution to support the emerging Smart Grid applications that aim to optimize the efficiency and reliability of the power grids. PLC is particularly appealing for Smart Grid applications due to its low deployment cost over the existing power line infrastructure.

PLC channels are known to be highly challenging environments for digital communication because they have to contend with bursts of impulse noise that can be highly random. Further, frequency-selective channels of PLC can significantly limit the system performance and data rates.

Multiple Input Multiple Output (MIMO) PLC is being considered as a promising technology to increase the data rates as well as provide robustness against the harsh conditions encountered in PLC environments.

SUMMARY

In MIMO PLC communications, the design of a preamble structure that can be efficiently used to perform initial receiver synchronization is of a crucial importance. In addition, backward compatibility of the MIMO frame structure with legacy NB-PLC standards is a significant issue in terms of marketability and usability.

The present patent application discloses systems, methods, devices, apparatuses and associated computer-readable media having executable program instructions thereon for providing or otherwise facilitating MIMO-based data communications in a PLC network. Broadly, various aspects of a PLC network operative with a suitable Orthogonal Frequency Division Multiplexing (OFDM) modulation scheme are disclosed for generating MIMO frames with suitable preamble portions configured to provide backward compatibility with legacy PLC devices and facilitate different receiver tasks such as frame detection and symbol timing, channel estimation and automatic gain control (AGC), including robust preamble detection in the presence of impulsive noise and frequency-selective channels of the PLC network.

In one aspect, an embodiment of a MIMO frame generation method operative in a PLC network including one or more MIMO PLC devices and one or more legacy PLC devices operating according to a legacy PLC data transmission standard using OFDM is disclosed. The PLC network may be configured to support a MIMO channel having $N_T$ transmit phases or ports and $N_R$ receive ports. The claimed embodiment comprises, inter alia, generating or otherwise providing at a first transmit port of a MIMO PLC device, corresponding to a first transmit phase of the MIMO frame, a legacy preamble (L-Preamble) portion compliant with the legacy PLC data transmission standard, e.g., IEEE 1901.2 standard, which is followed by a first Frame Control Header (FCH) portion that includes legacy FCH data and MIMO-compliant FCH data. A first MIMO-compliant preamble (M-Preamble) portion comprising a plurality of components follows the FCH portion, wherein each component includes a SYNCM symbol and associated guard interval, collectively referred to as $S_1$, and a SYNCP symbol and associated guard interval, collectively referred to as $S_2$. A first payload data portion follows the M-preamble portion as part of the first transmit phase. At remaining transmit ports of the MIMO PLC device, corresponding to the rest of the transmit phases of the MIMO frame, respective L-Preamble portions and FCH portions that are cyclic-shifted by a select amount (CS-L) are provided, which are followed by corresponding M-Preamble portions and respective payload data portions that are cyclic-shifted by a select amount (CS-M), wherein operations at the transmit ports of the MIMO PLC device are substantially synchronized in time domain with respect to generating the MIMO frame.

In another aspect, an embodiment of a hybrid preamble detection method is disclosed that is operative at a PLC device adapted to receive data in a PLC network using an OFDM modulation scheme. The claimed embodiment comprises, inter alia, determining an initial estimate of a preamble start in a received PLC signal stream based on a delayed correlation process, e.g., upon recognizing a preamble's presence therein; and responsive to a search range around the initial estimate of the preamble start, determining a final estimate thereof based on a cross-correlation process involving a known preamble sequence that is indicative of a start of a PLC frame in the received PLC signal stream.

In yet another aspect, an embodiment of a cyclic shift (CS) selection method operative for a MIMO PLC network, e.g., $[N_T \times N_R]$ network, is disclosed. The claimed embodiment comprises, inter alia, obtaining, generating or otherwise configuring an initial CS vector having default CS amounts that may be applied to different transmit phases of a MIMO data signal frame at a MIMO transmitter coupled to the MIMO channel. Upon applying the initial CS vector to one or more portions of the MIMO data signal frame, at least one of the L-Preamble and/or M-Preamble portions are transmitted over the PLC network. Thereafter, the channel is monitored by the MIMO transmitter for an Acknowledgement (ACK) frame. If no ACK signal frame is received from a receiver device within a timeout period, the initial CS vector is interleaved or otherwise rearranged in an iterative process for retransmission of the MIMO data signal frame until the ACK signal frame is received, thereby a more optimal channel may be presented for data communications.

In a still further aspect, an embodiment of a collision rate reduction method operative for a MIMO PLC network, e.g., $[N_T \times N_R]$ network, that includes MIMO devices and legacy devices is disclosed. The claimed embodiment comprises, inter alia, obtaining, generating or otherwise configuring legacy FCH data and generating a CRC sequence therefor using a suitable generator polynomial (e.g., CRC5, CRC8, etc.). At least a portion of the legacy FCH data is intentionally perturbed to introduce an error therein. The MIMO transmitter encodes and transmits the signal frame including the perturbed legacy FCH data and the CRC sequence of unperturbed legacy FCH data, wherein the CRC sequence will automatically fail at a legacy PLC receiver device in order to ensure a predetermined back-off time (e.g., a maximum back-off time) by the legacy PLC receiver device when it receives the MIMO data signal frame via the PLC network. In one implementation, the legacy FCH data may be perturbed so as to maximize a Hamming distance between the perturbed and unperturbed FCH data. In other implementations, the legacy FCH data may be disturbed by inverting all or a portion of the bits, adding extra bits, deleting one or more bits, and the like.

In still further aspects, additional or alternative embodiments of methods operative at MIMO transmitter or receiver devices may be provided in accordance with the teachings herein. In still further related aspects, embodiments of apparatuses and non-transitory tangible computer-readable media containing program instructions or code portions stored thereon are disclosed for performing one or more processes, methods and/or schemes set forth herein.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 5A depicts an example PHY frame structure according to a legacy narrowband PLC data transmission standard using OFDM, e.g., the IEEE 1901.2 standard;

FIGS. 5C and 5D depict unitary space-time transmission structures for a [2×2] and a [4×4] MIMO channel, respectively, in a PLC network;

FIGS. 7A and 7B depict flowcharts of an example MIMO frame generation method according to one or more embodiments;

FIG. 8 depicts a block diagram of an example preamble detector according to an embodiment;

FIGS. 9A-9B and 10A-10B illustrate and exemplify a delayed correlation scheme for use with an embodiment of the preamble detector of FIG. 8;

FIGS. 15A and 15B depict example plots of cross-correlation profiles without and with data peak folding according to an embodiment of the cross-correlation scheme of FIG. 14;

DETAILED DESCRIPTION OF THE DRAWINGS

Specific embodiments of the invention will now be described in detail with reference to the accompanying Figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. As used herein, the term "couple" or "couples" is intended to mean either an indirect or direct electrical connection unless qualified as in "communicably coupled" which may include wireless connections. Thus, if a first device couples to a second device, that connection may be through a direct electrical connection, or through an indirect electrical connection via other devices and connections.

Figure 1:
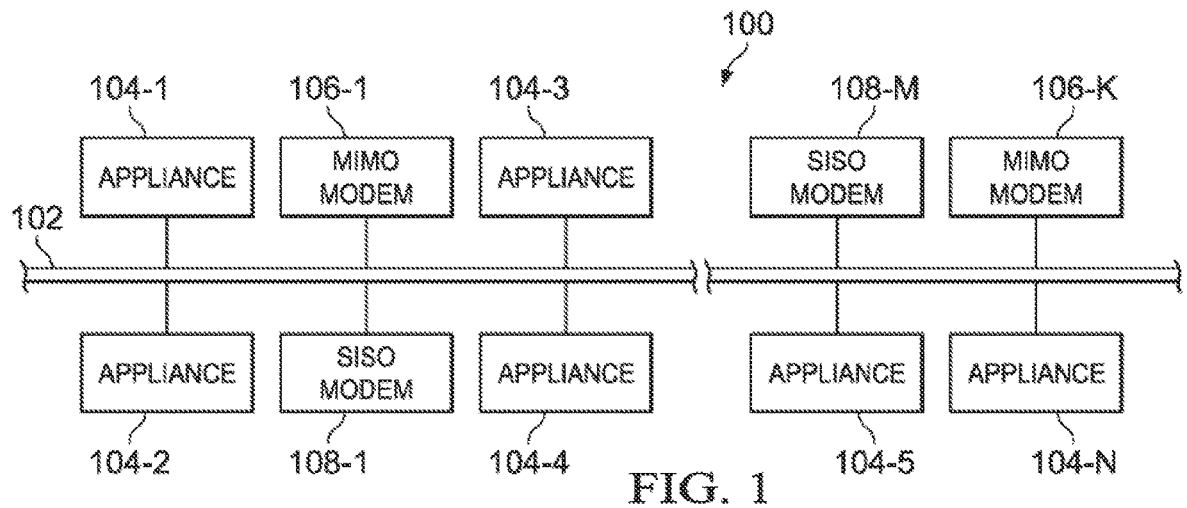
FIG. 1 depicts an example PLC network wherein one or more embodiments of the present patent application may be practiced.

Referring now to the drawings and more particularly to FIG. 1, depicted therein is an example PLC network 100 wherein one or more embodiments of the present patent application may be practiced. For purposes of the present disclosure, reference numeral 102 refers to at least a portion of a power line installation comprising a plurality of power lines or wires that may include high-voltage (HV) lines (e.g., ranging from 110 kV to 380 kV), medium-voltage (MV) lines (e.g., ranging from 10 kV to 30 kV) and low-voltage (LV) lines (e.g., ranging from 110 V to 400 V), or any combination thereof, which may be interspersed with appropriate grid-to-customer infrastructural components such as substations, transformers, phase converters, relays, coupling capacitors, electricity usage meters, breaker panels and other elements facilitating power distribution over varying distances (e.g., ranging from hundreds of miles to distances within customer premises). Accordingly, power line installation 102 may be localized within single-family residences, apartment buildings, industrial/commercial premises, etc., as well as extending beyond in certain embodiments, wherein the various infrastructural components are not shown for the sake of clarity. In one illustrative implementation, power line installation 102 may be provided as part of a power distribution system disclosed in commonly-assigned U.S. Pat. No. 8,265,197 entitled "OFDM TRANSMISSION METHODS IN THREE PHASE MODES," issued in the name(s) of Il Han Kim et al., incorporated by reference herein.

A plurality of electrical appliances 104-1 to 104-N, which may comprise any known or heretofore unknown residential, industrial or commercial appliances, may be coupled to the power line installation 102 in a conventional manner. Whereas appliances 104-1 to 104-N do not normally take part in data communications over the wiring of power line installation 102, they can affect the channel over which PLC data devices must communicate. In an alternating current (AC) implementation, depending on whether single-phase power or polyphase (e.g., three-phase) power is being distributed, the wiring of power line installation 102 may comprise a plurality of conductors, which often vary based on a country's electrical transmission standards. In a typical U.S. home installation, three wires, i.e., a phase (P) or live (L) line, a neutral (N) line and a protective earth (PE) line, may be provided. For a three-phase transmission system, three separate live lines (i.e., L1, L1 and L3) may be provided in addition to the N and PE lines.

In a backward-compatible implementation of the example PLC network 100, a plurality of Single-Input Single-Output (SISO) modems or data devices 108-1 to 108-M may be coupled to a pair of the wires of power line installation 102, e.g., the P-N wire pairing for both transmit and receive devices, for communicating data according to a legacy PLC data transmission standard using OFDM, e.g., PRIME, G3, ITU G.hnem, Home Plug AV, IEEE 1901.2, and the like. Further, a plurality of Multiple-Input Multiple-Output (MIMO) modems or data devices 106-1 to 106-K may be advantageously coupled to two or more wiring pairs of example power line installation 102 for communicating data according to the embodiments set forth in detail hereinbelow.

Figure 2:
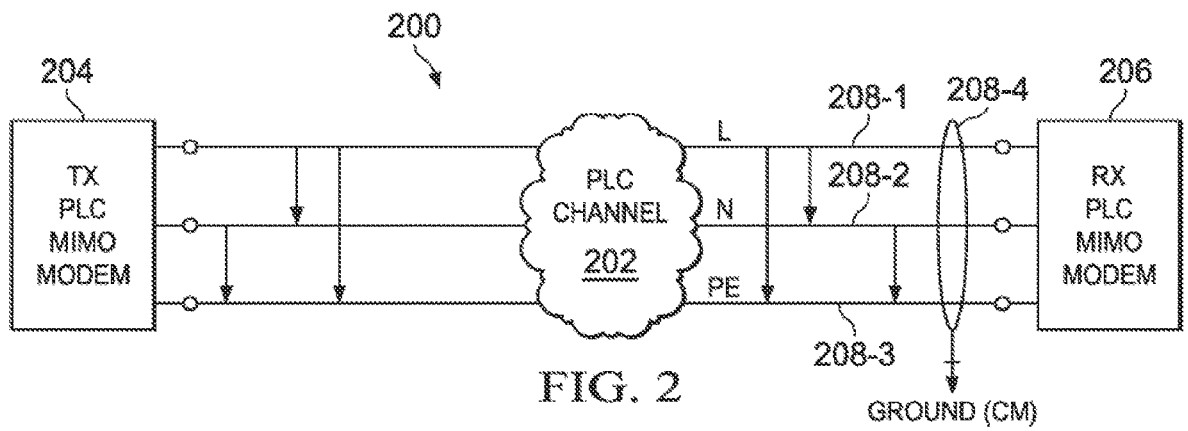
FIG. 2 depicts an example MIMO transmitter/receiver system for communications via a PLC channel according to an embodiment.

FIG. 2 depicts an example MIMO transmitter/receiver system 200 for effectuating data communications via a PLC channel 202 according to an embodiment wherein a 3-wire power line installation is illustrated. A transmit (Tx) modem or data device 204 and a receive (Rx) modem or data device 206 are coupled to the 3-wire power line installation comprising L line 208-1, N line 208-2 and PE line 208-3. On the transmit side, although data signals may be fed using the three pairs of wiring, i.e., P-N, P-PE and N-PE pairs, because of Kirchoff's law that the sum of the three input signals must be zero, only two of the three pairs may be used as transmit ports for data injection. On the receive side, all three P-N, P-PE and N-PE pairs may be used as receive ports in addition to a common mode (CM) signal, which is the voltage difference between the sum of the voltages on the three wires and the ground, shown in FIG. 2 as CM port 208-4. It should be appreciated by one skilled in the art that for EMI reasons, the CM path may be used for the receiving side only.

Figure 3:
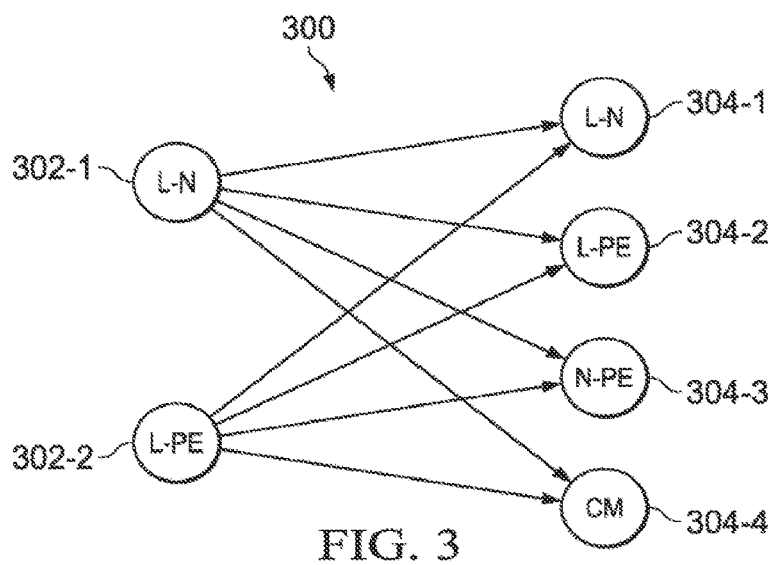
FIG. 3 depicts an example MIMO channel with $[N_T=2]$ transmit phases or ports and $[N_R=4]$ receive paths operative in the embodiment of FIG. 2.

FIG. 3 depicts an example MIMO channel 300 with two transmit ports and four receive ports operative in the embodiment of FIG. 2. Reference numerals 302-1 and 302-2 refer to two example transmit ports, L-N and L-PE, respectively, which as will be seen further below can give rise to two corresponding transmit phases in a MIMO transaction. Accordingly, the terms "transmit port" and "transmit phase" may be used somewhat interchangeably in certain embodiments of the present patent application. On the receive side, data may be received via all four receive ports, L-N 304-1, L-PE 304-2, N-PE 304-3 and CM 304-4, which may be referred to as receive paths. Accordingly, MIMO channel 300 is configured as a [2×4] channel in an exemplary 3-wire power line installation of FIG. 2. Similar to the [2×4] MIMO channel 300 exemplified herein, a generalized MIMO channel of $[N_T \times N_R]$ may be formed in a power line installation having a plurality of wires depending on the particular combinations of wire pairings being used. It should be appreciated that not all possible combinations of ports on the transmit side or receive side may need to be utilized in a MIMO PLC channel. Further, although the foregoing MIMO channel embodiments are based on AC power lines, a DC transmission system may also be used for implementing a MIMO channel. One skilled in the art will recognize that the return path may not be a ground line in certain DC transmission systems. In such a scenario, a MIMO channel may be implemented, for example, by using the earth as ground with respect to the energized lines of a DC transmission system, which facilitates multiple Tx/Rx ports via appropriate differential pairs.

Figure 4A:
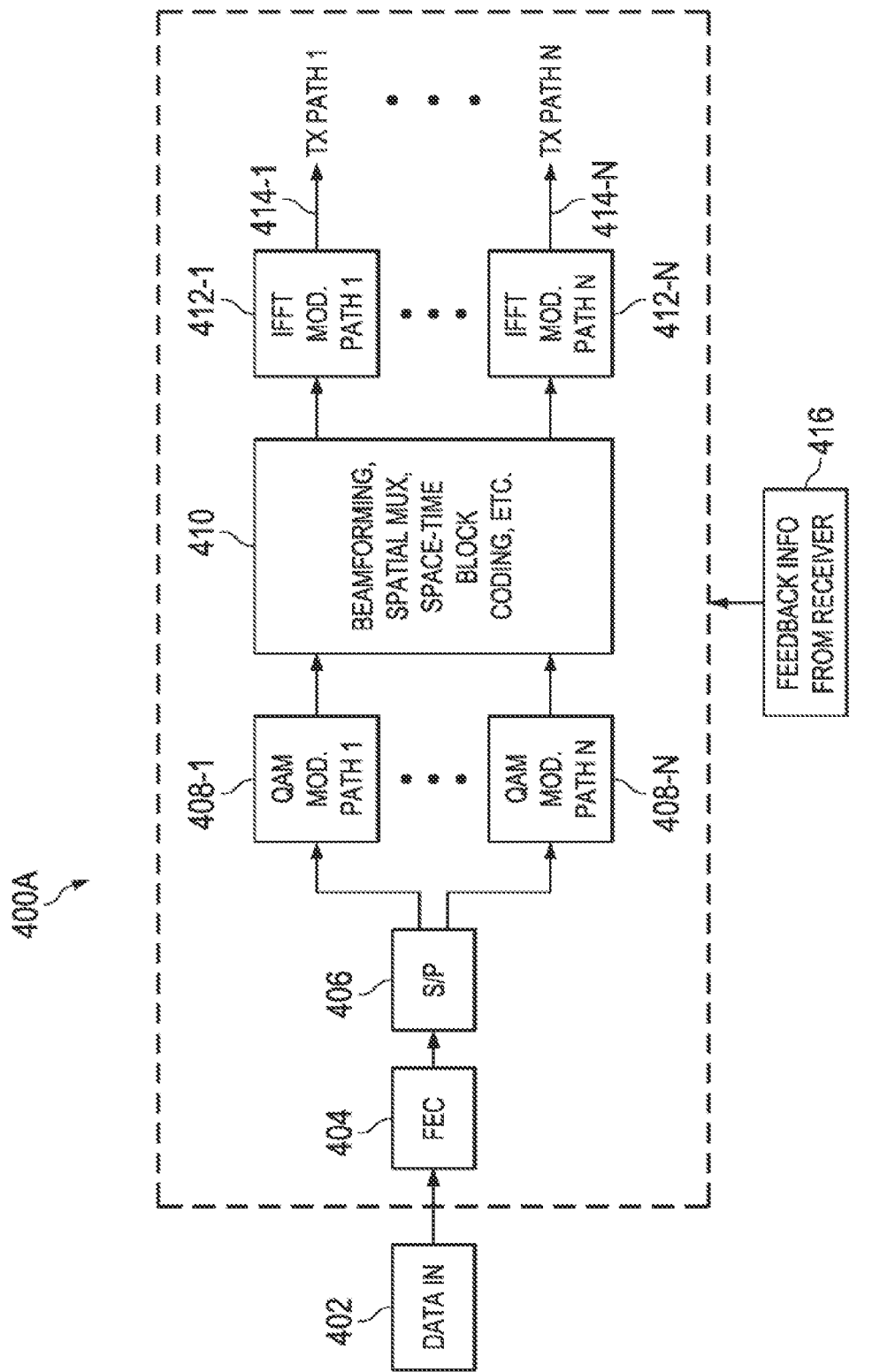
FIG. 4A depicts an example multipath OFDM transmitter system for use in a MIMO PLC system according to an embodiment.
Figure 4B:
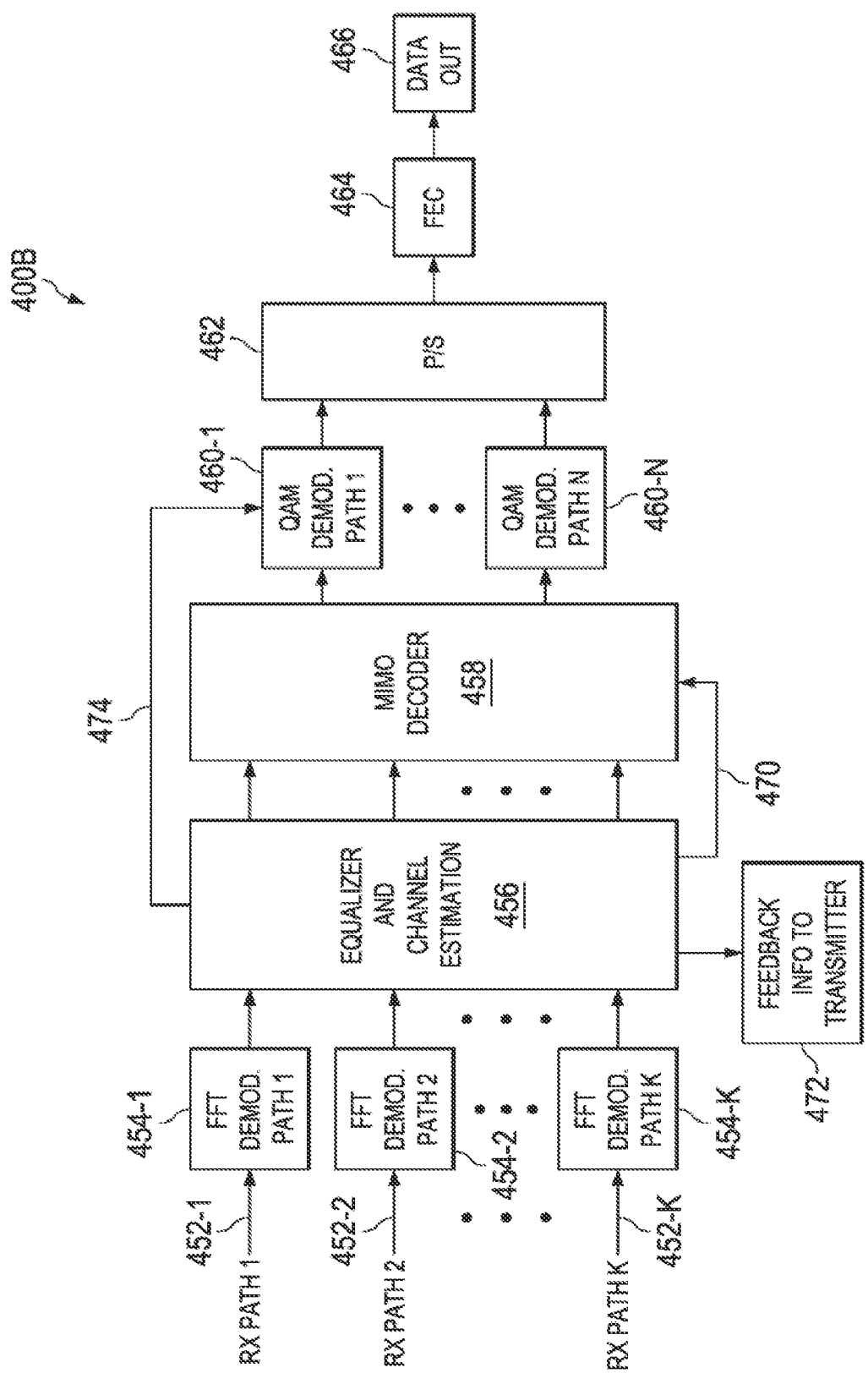
FIG. 4B depicts an example multipath OFDM receiver system for use in a MIMO PLC system according to an embodiment.

A suitable OFDM technique may be utilized for transmitting data in an example MIMO PLC network described above. Referring now to FIGS. 4A and 4B, high level block diagrams of example multipath OFDM transmitter and receiver systems are respectively illustrated, which may be implemented as part of a MIMO modem of a PLC device operative to effectuate Tx and Rx operations using suitable PHY level MIMO data frames as will be described in detail further below. In the following sections of detailed description, when the focus is on Tx operations at a PLC device, such a device or modem may be referred to as a PLC transmit device or modem. Likewise, a PLC receive device or modem may be described in particular reference to Rx operations.

At transmit device 400A, incoming data (Data In) 402 may be appropriately encoded involving a forward error correction (FEC) block 404, which may then be provided to a serial-to-parallel (S/P) converter 406 for transmission via a number of transmit paths or ports. On each path, a suitable modulator, e.g., adaptive quadrature amplitude modulation (QAM) or phase-shift keying (PSK), is operative to map the encoded data streams into symbols, as illustrated by modulator blocks 408-1 to 408-N. A MIMO encoder block 410, which may be based on beamforming, spatial multiplexing or space-time block coding, etc., is operative to generate data streams of suitable diversity that are provided to respective inverse fast Fourier transform (IFFT) blocks 412-1 to 412-N. As will be described below, the output of IFFT blocks 412-1 to 412-N may be further processed and provided as a MIMO data signal comprising multiphase PHY level data frames that are injected into a power line installation via a front end block operative to effectuate a corresponding number of Tx paths 414-1 to 414-N. A feedback block 416 may be configured to provide various pieces of information from a receiver device (e.g., relative to channel estimation or quality, adaptive OFDM tone map information, acknowledgement signals, etc.) to the receiver 400A, at least part of which may be used in effectuating certain embodiments set forth herein.

At receiver 400B, a plurality of FFT demodulators 454-1 to 454-K are provided corresponding to K receive paths 452-1 to 452-K that may be effectuated via a suitable front end block (not shown). A channel equalizer and associated channel estimation module 456 may be used to calculate a suitable channel matrix that may be used by a decoder 458 to obtain or recover a plurality of data paths, which are demodulated by corresponding demodulators 460-1 to 460-N. Respective data streams are provided to a parallel-to-serial (P/S) converter 462 for assembling the data. Thereafter, FEC decoding 464 is applied to obtain the data 466. As illustrated, channel estimation block 456 may provide appropriate information to MIMO decoding and demodulation blocks as exemplified by signal paths 470, 474. In addition, channel information may be provided as feedback information to transmitter 400A. Additional details relative to OFDM transmission in a MIMO channel using beamforming and other techniques may be found in U.S. Pat. No. 8,265,197, referenced and incorporated hereinabove.

As pointed out previously, PLC data communications using OFDM may be accomplished according to a variety of standards including, e.g., IEEE 1901.2. Without limitation, an overview of IEEE 1901.2 will now be described in order to better understand certain embodiments as example implementations of the present invention. A more detailed overview is provided in "An Overview, History, and Formation of IEEE P1901.2 for Narrowband OFDM PLC", Jul. 2, 2013. Both this document and IEEE 1901.2 specification entitled "Standard for Low-frequency (less than 500 kHz) Narrowband Power Line Communications for Smart Grid Applications", approved Oct. 31, 2013, are incorporated by reference herein.

IEEE 1901.2 specifies communications for low frequency (less than 500 kHz) narrowband power line devices via AC and DC electric power lines. Broadly, it describes Physical (PHY) layer and Media Access Control (MAC) modes of operation for Federal Communications Commission (FCC), European Committee for Electrotechnical Standardization (CENELEC), and Association of Radio Industries and Businesses (ARIB) bands. This standard supports indoor and outdoor communications in the following environments: a) low voltage lines (less than 1000 V), such as the line between a utility transformer and meter; b) through transformer low-voltage to medium-voltage (1000 V up to 72 kV); and c) through transformer medium-voltage to low-voltage power lines in both urban and in long distance (multi-kilometer) rural communications. The standard uses transmission frequencies less than 500 kHz and data rates may be configured to be scalable to 500 kbps depending on the application requirements. This standard addresses grid-to-utility meter, electric vehicle to charging station, and within home area networking communications scenarios, among others.

The MAC layer is an interface between the logical link control (LLC) layer and the PHY layer. The channel access is accomplished by using the carrier sense multiple access with collision avoidance (CSMA/CA) mechanism with a random back-off time. The random back-off mechanism spreads the time over which stations attempt to transmit, thereby reducing the probability of collision. Each time a device wishes to transmit data frames, it waits for a random period. If the channel is found to be idle, following the random back-off, the device transmits its data. If the channel is found to be busy, following the random back-off, the device waits for another random period before trying to access the channel again.

Details regarding PHY building blocks have been standardized in various IEEE publications, resulting in a uniform PHY structure for NB PLC. As is known in the art, the fundamental PHY elements in the transceiver start with a scrambler operating as part of a FEC block, which functions to randomize the incoming data. Standardized scramblers (e.g., in IEEE 1901.2, G3-PLC and PRIME) utilize the same generator polynomial, as illustrated in the following equation:

$$S(x) = x^7 \oplus x^4 \oplus 1$$

Two levels of error correction may follow, starting with a Reed-Solomon (RS) encoder where typically data from the scrambler is encoded by shortened systematic Reed-Solomon (RS) codes using Galois Field (GF). The second level of error correction may employ a convolutional encoder with constraint rate K=7, which is followed by a two-dimensional (time and frequency) interleaver. These blocks may be configured to interoperate together in order to improve robustness and overall system performance in the presence of noise.

Following the FEC is the OFDM modulator involving one or more variants of modulation (BPSK, QPSK, 8PSK, etc.). The defined modulator further describes constellation mapping; the number of repetitions (4, 6, etc.); the type of modulation (differential, coherent); the frequency domain pre-emphasis; OFDM generation (IFFT, with cyclic prefix or CP); and windowing.

Structure of the physical frames is defined according to the fundamental system parameters, including the number of FFT sample points (e.g., 256, 512, etc.) and overlapped samples, the size of cyclic prefixes, the number of symbols in the preamble, and the sampling frequency. The PHY layer supports two types of frames: the data frame and the ACK/NACK frame. Each frame starts with a preamble used for synchronization and detection, as well as automatic gain control (AGC) adaptation. The preamble is followed by data symbols allocated to the Frame Control Header (FCH) with the number of symbols depending on the number of carriers used by the OFDM modulation.

The FCH is a data structure transmitted at the beginning of each data frame following the preamble. It contains information regarding modulation and the length of the current frame in symbols. The FCH also includes a frame control checksum (CRC, or cyclic redundancy check), which is used for error detection. The size of the CRC depends on the frequency band being utilized (e.g., CRC5 for CENELEC A and CENELEC B and CRC8 for FCC).

A typical legacy frame structure of a PHY data frame 500A according to IEEE 1901.2 for SISO data transmission is shown in FIG. 5A. By way of illustration, data frame 500A comprises a legacy preamble (L-Preamble) portion 502 that may be composed of 8 or 12 identical synchronization plus 1 (SYNCP) symbols and one full synchronization minus 1 (SYNCM) symbol and the first half of a SYNCM symbol in the time domain. Each of the SYNCP and SYNCM symbols is provided to be 256 samples long. The L-Preamble portion 502 is immediately followed by FCH portion 504. The SYNCP symbols are used for AGC adaptation, symbol synchronization, channel estimation, and initial phase reference estimation. The SYNCM symbols are identical to SYNCP symbols except that all the carriers are $\pi$ phase shifted. At the receiver, the phase distance between symbol SYNCP and symbol SYNCM waveforms may be used for frame synchronization. Typically, a SYNCP symbol is generated by creating the desired number of equally spaced active carriers, with a magnitude of one. The phase of each carrier given by $\phi_c$ is a multiple of $\pi/8$ and is obtained starting with a chirp-like sequence carrier phases over the desired bandwidth. Thus, a possible method to generate the SYNCP symbol is to start in the frequency domain and create 72 complex carriers with the initial phases $\phi_c$.

The data symbols immediately after the L-Preamble portion 502 are reserved for FCH 504, the number of which may vary depending upon the band plan in use. For example, the FCH length is 12 symbols when 72 tones are used and no tone mask is applied. The FCH may be coherently modulated and a Coherent Mode bit in the FCH may be used to indicate whether differential mode or optional coherent mode of operation is indicated. The differential mode uses differential modulation schemes that do not require channel estimation to demodulate the received symbols (after initial channel estimation operations), while the coherent mode uses coherent modulation schemes that requires channel estimation be done in a more adaptive manner. FCH portion 504 contains information regarding the current frame, e.g., the type of frame, the tone map index of the frame, the length of the frame, etc. which is used by legacy devices. A coherent mode (CM) portion 506 comprising $S_1$ and $S_2$ symbols 506A, 506B, which are SYNCM and SYNCP symbols, respectively, may immediately follow FCH portion 504. The $S_1$ and $S_2$ symbols 506A, 506B are transmitted only in the coherent mode in order to be used for performing initial channel estimation for the data demodulation.

Figure 5B:
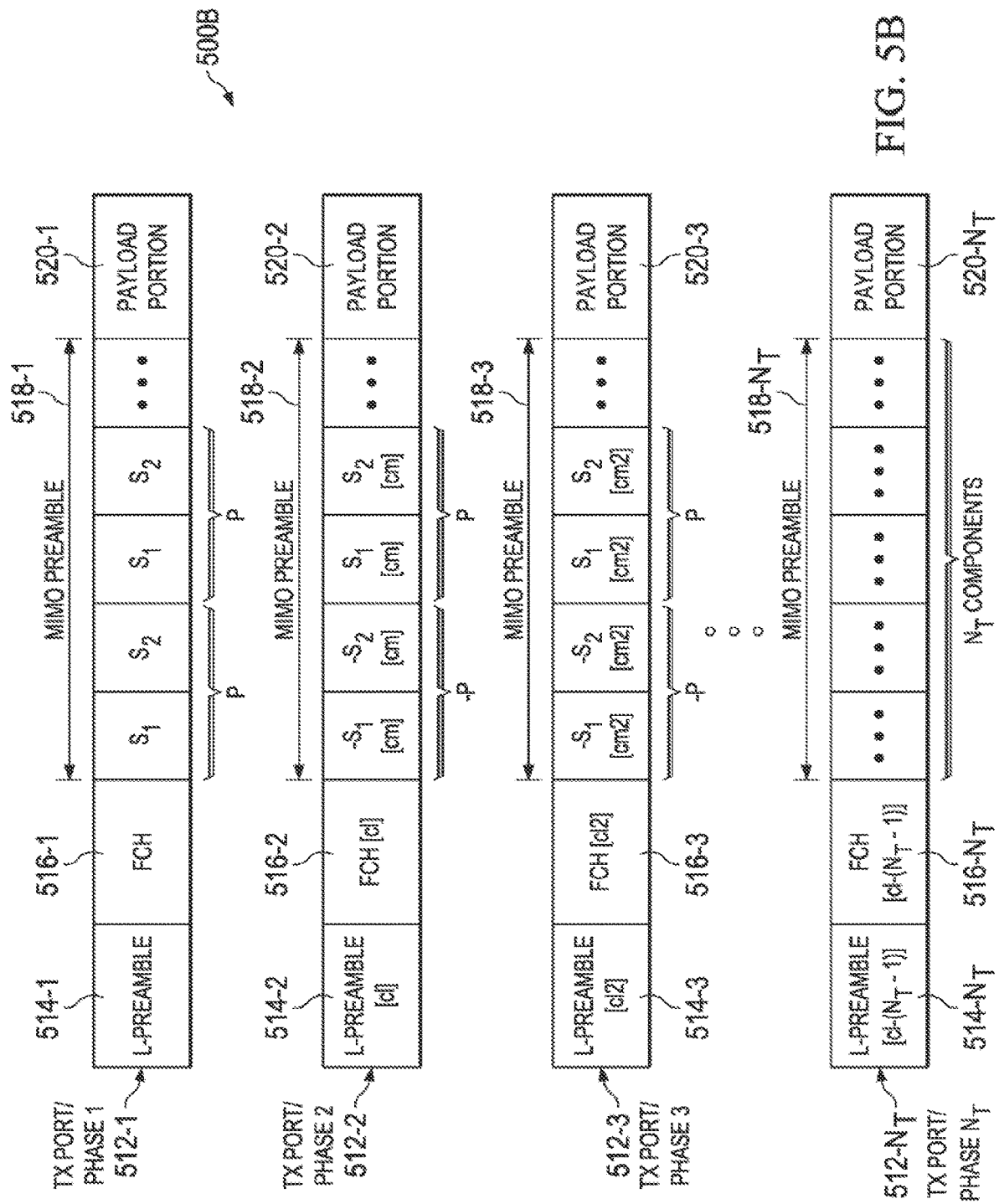
FIG. 5B depicts an example PHY frame structure for multiphase transmission in a hybrid MIMO PLC network comprising MIMO-compliant PLC devices as well as legacy PLC devices according to an embodiment of the present patent application.

FIG. 5B depicts an example PHY frame structure 500B for multiphase transmission in a hybrid MIMO PLC network comprising MIMO-compliant PLC devices as well as legacy PLC devices according to an embodiment of the present patent application. It should be appreciated that the frame structure 500B is operative for providing backward compatibility with the legacy frame structure set forth in FIG. 5A, and may be generalized for a MIMO channel configured with $N_T$ transport phases/ports and $N_R$ receive paths. Additionally or alternatively, as will be seen below, it may be further generalized for a pure MIMO PLC network wherein no legacy devices (i.e., SISO devices) are deployed. By way of illustration, the backward-compatible MIMO frame structure 500B is adapted for a channel configuration with $N_T$ ports, wherein $N_T$ phases 512-1 to 512-$N_T$ of the frame are generated at corresponding Tx ports of a MIMO PLC device in a substantially synchronized manner in the time domain. To facilitate backward compatibility, the MIMO frame structure 500B starts with a legacy preamble (L-Preamble) portion according to a legacy PLC data transmission standard (e.g., IEEE 1901.2) so that legacy SISO (or "single-phase") devices can still detect the preamble of a MIMO frame and avoid transmitting data during an ongoing MIMO packet transaction. Following the L-Preamble portion, an FCH portion is provided that includes both legacy FCH data (i.e., information needed by the legacy devices) and MIMO-compliant data (i.e., information needed by the MIMO devices). A MIMO-compliant preamble (M-Preamble) portion follows the FCH portion, wherein $S_1$ and $S_2$ symbols (i.e., SYNCM symbol plus its guard interval (GI) and SYNCP symbol plus its GI) are advantageously provided, in a repetitive manner, for channel estimation required for the payload demodulation based on the number of number of Tx ports. For instance, each pair of $S_1$ and $S_2$ symbols may be treated as a component (P, or interchangeably P) wherein the number of components corresponds to the number of Tx ports, thereby resulting in $N_T$ components per transmit phase in the M-Preamble portion of the MIMO frame 500B, which is followed by a corresponding payload data portion.

Accordingly, a first transmit phase, e.g., phase 512-1, comprises a first L-Preamble portion 514-1, followed by a first FCH portion 516-1, which in turn is followed by a first M-Preamble portion 518-1 comprising a plurality of components, i.e., multiple repetitions of P={$S_1$:$S_2$}, and a first payload data portion 520-1. Likewise, each of the remaining phases 512-2 to 512-$N_T$ comprises corresponding portions as illustrated in FIG. 5B. Further, in accordance the teachings herein, select amounts of cyclic shift (CS) may be applied to one or more frame portions of the remaining transmit phases in order to avoid undesirable effects, e.g., unintended beamforming, etc. For example, transmitting the same L-Preamble sequence over all the transmit phases might result in receiving a null if a destructive combining occurs over the MIMO channel. Accordingly, in order to avoid such consequences, different CS values may be applied to the L-Preamble sequence transmitted from the different power phases. Also, the same CS values may be applied to the FCH symbols. It should be appreciated that the CS amount (CS-L, or interchangeably cs-I or cl) used for the L-Preamble may be configured to be sufficiently small in order to ensure that the legacy devices can still be able to detect the preamble. In addition, a cyclic shift (CS-M, or interchangeably cs-m or cm) may also be applied to the M-Preamble and the payload portions, which may be configured to be sufficiently large to minimize the power fluctuation between the M-Preamble and the payload to allow for proper automatic gain control and avoid signal clipping. Accordingly, the CS amounts applied to the L-Preamble and the M-Preamble portions may be configured to be different since they have different design criteria. One skilled in the art will recognize that the CS amounts may be obtained through channel models, simulations and/or measurements. For example, CS amounts may comprise integer multiples of a sample length and may be applied on a symbol-by-symbol basis similar to the OFDM cyclic prefix/suffix insertion.

Continuing to refer to FIG. 5B, it can be seen that the L-Preamble portions 514-2 to 514-$N_T$ of remaining phases 512-2 to 512-$N_T$ are cyclic-shifted by varying CS-L amounts, e.g., L-Preamble 514-2 having a CS amount [cl], L-Preamble 514-3 having a CS amount of [cl2], and so on. The same CS amounts are also applied to the FCH portions 516-2 to 516-$N_T$. The M-Preamble portions 518-2 to 518-$N_T$ are likewise cyclic-shifted by varying CS-M amounts, [cm] to [cm–($N_T$–1)]. Additionally and/or alternatively, the same CS-M amounts may be applied to the payload data portions 520-2 to 520-$N_T$. Furthermore, the $S_1$ and $S_2$ symbols of one or more of the {P} components of the M-Preamble portions of the remaining phases may be further manipulated, e.g., negation, time-inversion, etc., in order to achieve a unitary space-time diversity that can minimize noise enhancement during the MIMO channel estimation. It should be appreciated that such a preamble structure may operate to ensure substantially equalized power allocation on all transmit phases in a way not to detrimentally affect the channel quality. In the example embodiment of FIG. 5B, M-Preamble 518-2 of transmit phase 512-2 is shown to comprise components {–P} and {P}, thereby indicating a phase shifting of the first component. Examples of unitary transmission matrix structures 500C, 500D for [2×2] and [4×4] MIMO channels with orthogonal designs are shown in FIGS. 5C and 5D, respectively. In these embodiments, the X-axis represents the transmission time slot and the Y-axis represents the transmit power phase corresponding to a transmit port. In the coherent mode, the L-Preamble may be used to provide channel estimation for decoding the FCH, while the M-Preamble may be used to provide automatic gain control and channel estimation and for payload demodulation.

Figure 5E:
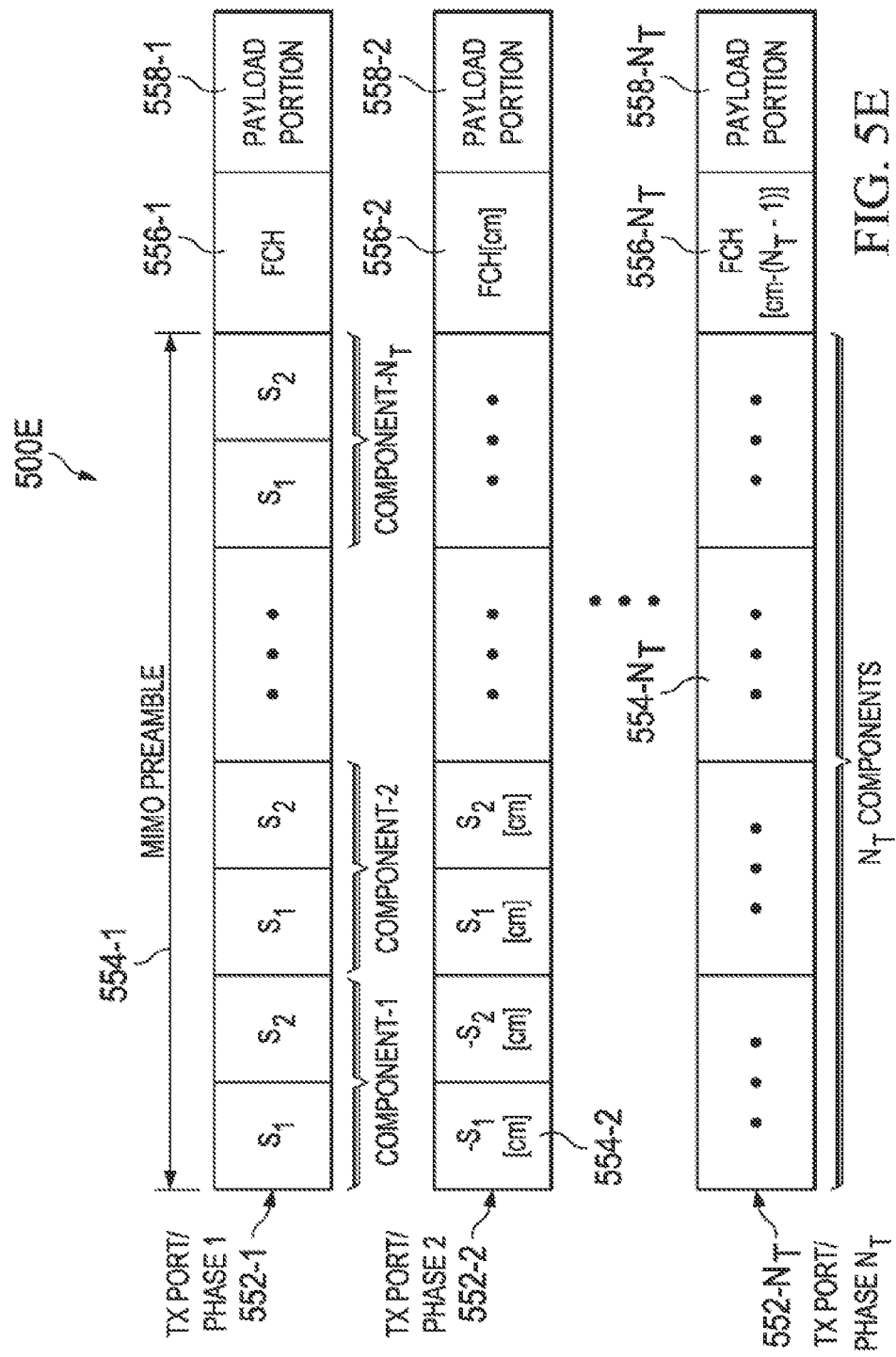
FIG. 5E depicts an example PHY frame structure for multiphase transmission in a pure MIMO PLC network according to an embodiment.

FIG. 5E depicts an example PHY frame structure 500E for multiphase transmission in a pure MIMO PLC network according to one embodiment. As there is no need for the frames to be backward-compatible in a MIMO-only PLC implementation, the example frame structure 500E does not include L-Preamble portions. Each transmit phase therefore begins with a MIMO-compliant preamble (i.e., M-Preamble) portion that includes a plurality of {P} components, for example, corresponding up to $N_T$ Tx ports, wherein each {P} component includes the $S_1$ and $S_2$ symbols described hereinabove. An FCH portion thereafter follows which now includes data that is needed by the MIMO-compliant devices only. A payload portion then follows similar to a legacy data frame structure. Whereas a first transmit phase 552-1 may comprise frame portions that are not cyclic-shifted, e.g., M-Preamble 554-1, FCH portion 556-1 and payload portion 558-1, the remaining phases may include frame portions having varying CS amounts, e.g., [cm] to [cm–($N_T$–1)], similar to the treatment set forth above. Accordingly, M-Preamble portions 554-2 to 554-$N_T$, FCH portions 556-2 to 556-$N_T$ and payload portions 558-2 to 558-$N_T$ may include suitable amounts of CS, which may be applied as before, e.g., on a symbol-by-symbol basis similar to OFDM cyclic prefix/suffix insertion. Further, the CS amounts may be varied in integer multiples of a sample length in one example implementation. Similar MIMO preamble designs may be obtained for a more generalized [$N_T$×$N_R$] PLC architecture as well.

Figure 6A:
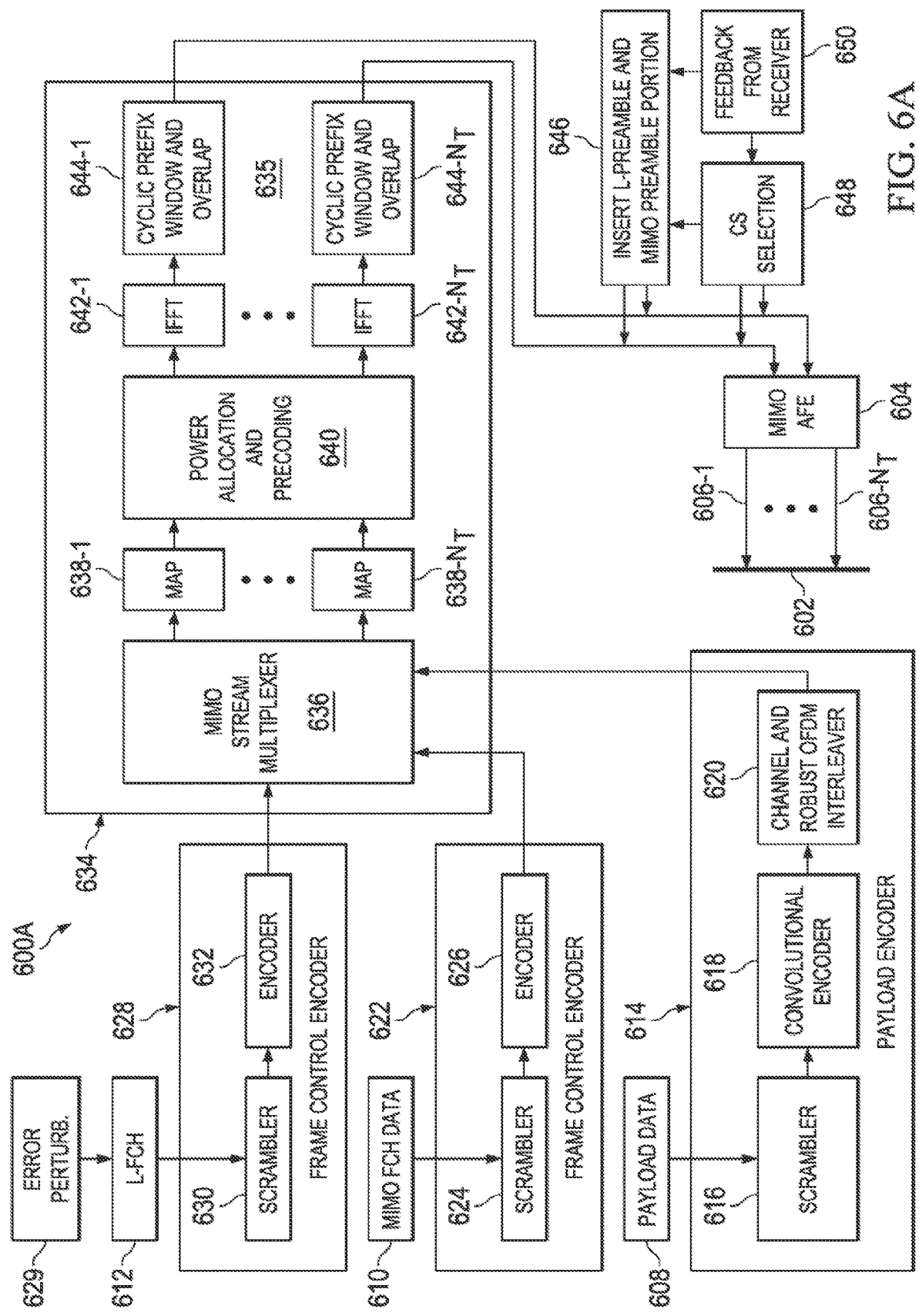
FIG. 6A depicts an example MIMO PLC transmitter device wherein one or more embodiments may be practiced according to the teachings of the present disclosure.

FIG. 6A depicts a block diagram of an example OFDM transmitter device operative to generate MIMO frames for MIMO PLC operation according to one or more embodiments of the present disclosure. In a backward-compatible PLC implementation, legacy FCH data 612 may be provided for use with legacy device operations as discussed previously, which may be processed in a frame control encoder block 628 comprising a scrambler 630 and encoder and CRC generator 632. In addition, a data perturbation block 629 may be optionally provided for purposes of introducing intentional errors in the FCH data in order to force a CRC failure at a legacy receiver in certain embodiments discussed further below. Another frame control encoder block 622 may be provided for processing MIMO-compliant FCH data 610, for example, including scrambler 624 and encoder and CRC operations 626. Payload data 608 likewise passes through an encoder block 614 that may include scrambler 616, convolution encoder 618 and channel and robust OFDM interleaver 620. A MIMO transmit encoder block 634 is operative to receive the outputs from FCH encoders 628, 622 and payload encoder 614. A stream mux block 636 of the MIMO transmit encoder block 634 is operative to combine the encoded legacy FCH data, encoded MIMO FCH data and encoded payload into a plurality ($N_T$) of transmit data streams corresponding to ($N_T$) phases of a MIMO frame. The data streams are provided to a multi-channel OFDM modulator 635 comprising corresponding symbol mapping blocks 638-1 to 638-$N_T$ that are coupled to a power allocation and precoding block 640, which in turn is coupled to corresponding IFFT blocks 642-1 to 642-$N_T$. Each modulated steam is processed by cyclic prefix, windowing and overlapping blocks 644-1 to 644-$N_T$ according to applicable OFDM schemes. A preamble insertion block 646 is operative to generate appropriate L-Preamble and M-Preamble portions as necessary, along with suitable CS selection 648, for the transmit phases as discussed previously. An analog front end (AFE) block 604 having an appropriate number of ports (e.g., up to $N_T$) couples the multiphase signal to a power line installation 602 of the PLC network as exemplified by paths 606-1 to 606-$N_T$. Furthermore, CS selection 648 and/or preamble insertion block 646 may be configured to receive feedback 650 from receiver devices to effectuate additional functionalities according to certain further embodiments described below.

Figure 6B:
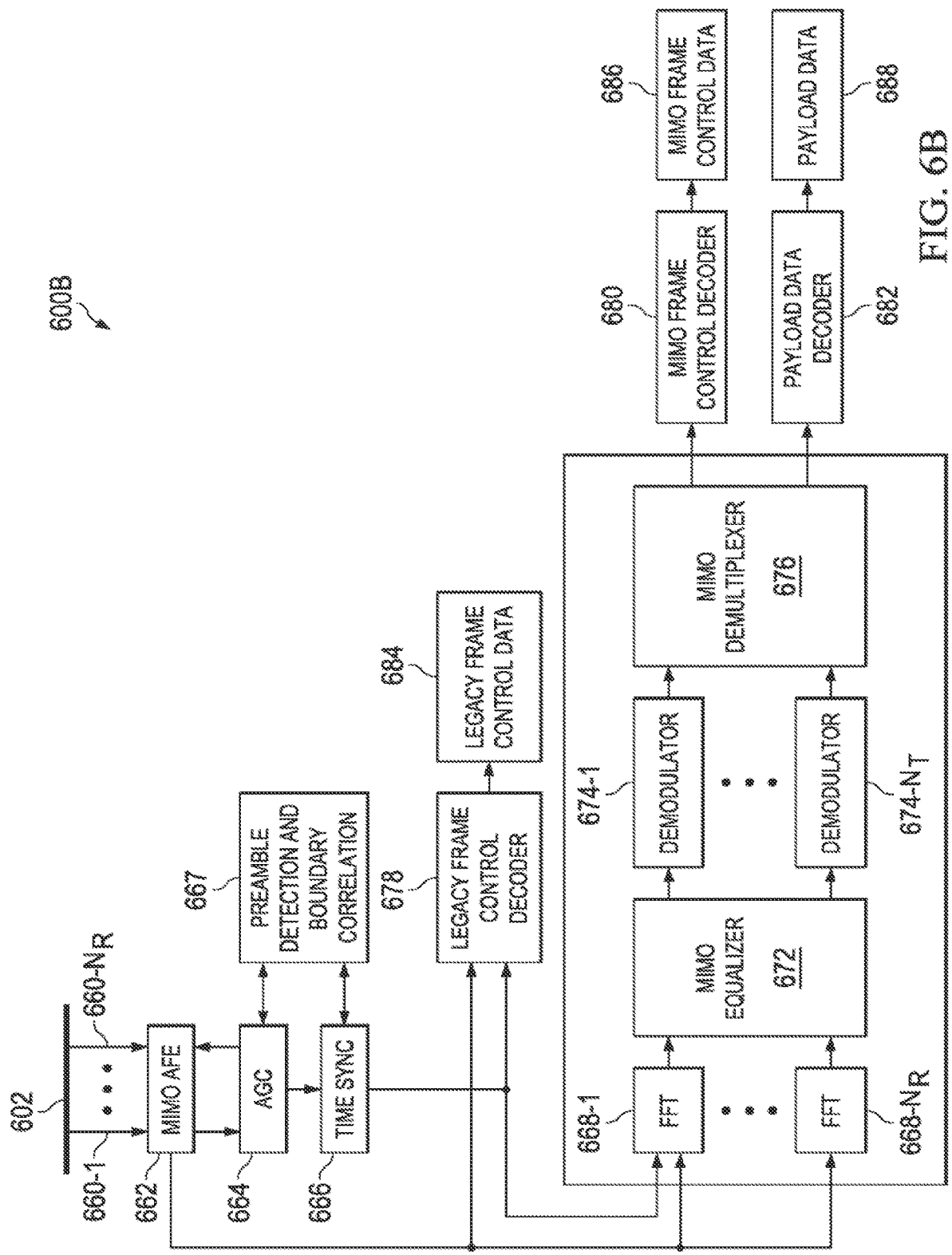
FIG. 6B depicts an example MIMO PLC receiver device wherein one or more embodiments may be practiced according to the teachings of the present disclosure.

FIG. 6B depicts a block diagram of an example OFDM receiver 600B wherein one or more embodiments may be practiced according to the teachings of the present disclosure. A MIMO AFE block 662 may be coupled to the power line installation 602 via a plurality of receive ports 606-1 to 606-$N_R$ and is operative with corresponding AGC modules 664 and time synchronization blocks 666 to feed separate FCH and payload recovery modules. A preamble detection block 667 may be provided in association with the time synchronization block(s) 666 to detect preambles and symbol boundaries in a received MIMO signal that includes varying CS amounts across different transmit phases, as will be described in additional detail further below.

In general, data recovery processes at receiver 600B are roughly opposite of the operations at transmitter 600A, e.g., in reverse order, and will not be described in additional detail herein. Broadly, a legacy FCH decoder block 678 including suitable FFT modules is operative to recover legacy FCH data 684. MIMO payload and FCH data may be processed through another suitable number of FFT modules 668-1 to 668-$N_R$, which feed into a MIMO equalizer 672 that generates or otherwise recovers the transmit streams which are demodulated by corresponding demodulator blocks 674-1 to 674-N$_T$. A MIMO demux block 676 is operative to process the demodulated streams, feeding into a payload data decoder 682 for recovering payload data 688. MIMO-compliant FCH data 686 may also be recovered from the demux output, which is separately processed by a MIMO FCH decoder 680.

Figure 7A:
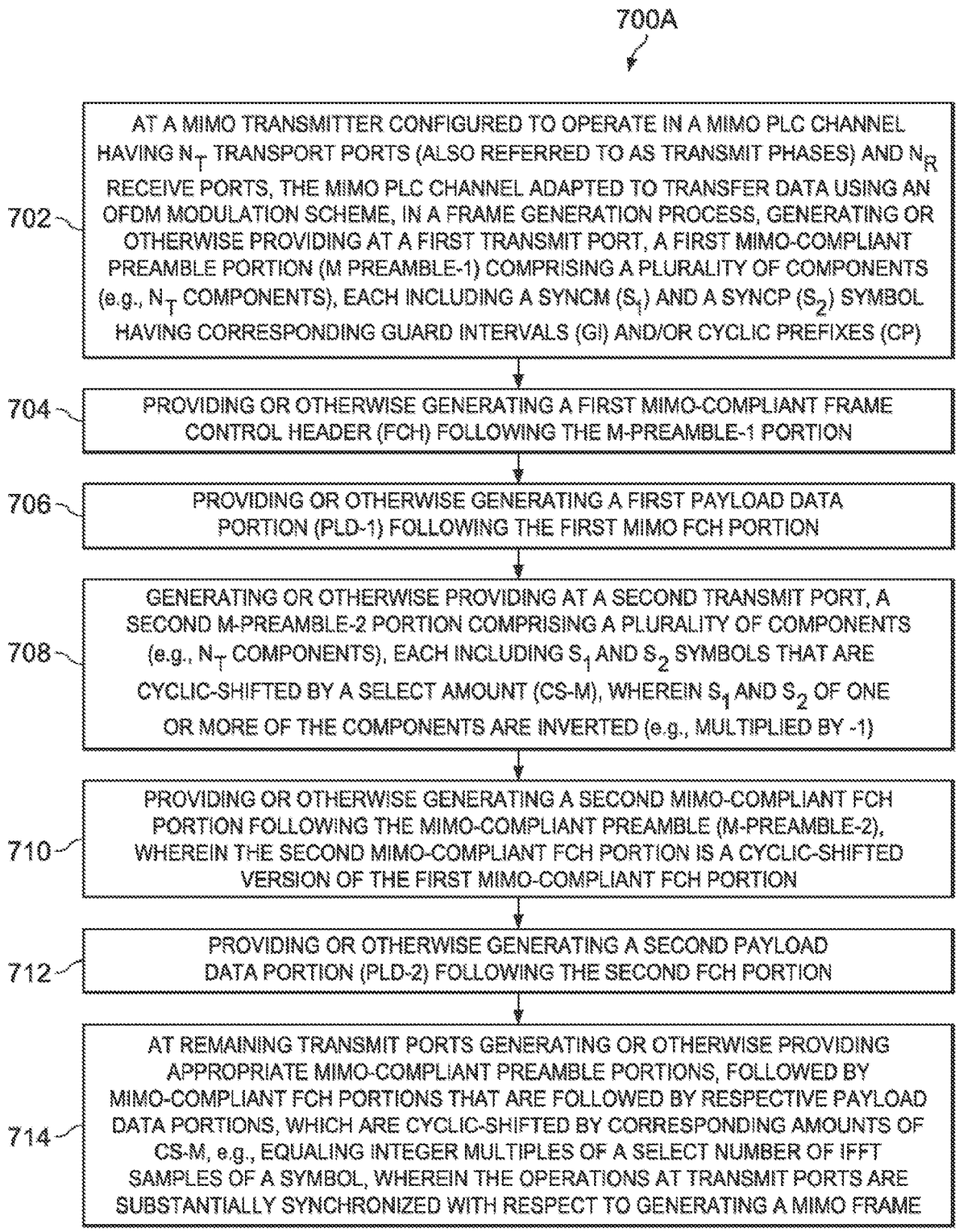

FIGS. 7A and 7B depicts flowcharts of an example MIMO frame generation method according to one or more embodiments, depending on whether backward-compatible MIMO frames or pure MIMO-only frames are involved. One skilled in the art will recognize upon reference hereto that various steps, blocks or acts set forth in the two flowcharts may be combined in a complementary fashion in a number of ways. Reference numeral 700A of the flowchart in FIG. 7A illustrates the operations that may take place at MIMO transmitter (i.e., a PLC device having a MIMO modem). By way of generalization, the MIMO transmitter may be configured to operate with a MIMO PLC channel having $N_T$ transport ports/phases, and $N_R$ receive ports. As described above, the MIMO PLC channel is adapted to transfer data using a suitable OFDM modulation scheme. At block 702, the transmitter is operative to generate or otherwise provide at a first transmit port, a first MIMO-compliant preamble portion (M-Preamble-1) comprising a plurality of components (e.g., $N_T$ components), each including a SYNCM ($S_1$) and a SYNCP ($S_2$) symbol having corresponding GI and/or CP. The transmitter is further configured to provide or otherwise generate a first MIMO-compliant Frame Control Header following the M-Preamble-1 portion (block 704). Thereafter, a first payload data portion (PLD-1) is provided following the FCH-M portion (block 706). At a next transmit port, e.g., a second transmit port, a second M-Preamble-2 portion comprising a plurality of components (e.g., $N_T$ components) is generated or otherwise provided (block 708). As discussed above, each component includes $S_1$ and $S_2$ symbols that are cyclic-shifted by a select amount (CS-M), wherein $S_1$ and $S_2$ symbols of one or more of the components are inverted (e.g., multiplied by −1). As set forth at blocks 710, 712, a second MIMO-compliant FCH portion following the M-Preamble-2 portion is provided, wherein the second MIMO-compliant FCH portion is a cyclic-shifted version of the first MIMO-compliant FCH portion. Thereafter, a second payload data portion (PLD-2) following the second FCH-M portion is provided or otherwise generated. At remaining transmit ports, actions relating to generating or otherwise providing appropriate MIMO-compliant preamble portions, followed by MIMO-compliant FCH portions that are followed by respective payload data portions, are performed (block 714). These frame portions are cyclic-shifted by corresponding amounts of CS-M equaling integer multiples of a select number of IFFT samples of a symbol in one implementation. It should be apparent that the foregoing operations at transmit ports of the transmitter are substantially synchronized in time domain with respect to generating a MIMO frame.

In a hybrid or mixed-mode MIMO PLC network (e.g., including one or more MIMO-compliant devices and one or more legacy SISO devices), process 700B shown in FIG. 7B illustrates the various steps, blocks and/or acts that may take place a backward-compatible MIMO transmitter. As before, the MIMO transmitter may be configured to operate in a MIMO PLC channel having $N_T$ transport ports/phases and $N_R$ receive ports. At block 752, the frame generation process involves generating or otherwise providing at a first transmit port a legacy preamble portion (L-Preamble), e.g., compliant with IEEE 1901.2 standard, and an FCH portion including a legacy FCH data and MIMO-compliant FCH data, followed by a MIMO-compliant preamble portion (M-Preamble-1) comprising a plurality of components (e.g., $N_T$ components), each including $S_1$ and $S_2$ symbols, which is followed by a first payload data portion. At block 754, the frame generation process involves, generating or otherwise providing at remaining ports corresponding L-Preamble portions and FCH portions that are cyclic-shifted by an amount (CS-L) or integer multiples thereof, followed by corresponding M-Preamble portions that are followed by respective payload data portions, which are cyclic-shifted by corresponding amounts of CS-M. As before, operations at transmit ports are substantially synchronized in the time domain with respect to generating a backward-compatible MIMO frame. It should be appreciated that in a mixed-mode MIMO PLC network implementation, it is possible to effectuate transactions between a MIMO device and a SISO device in either directions, i.e., receive and/or transmit operations.

As pointed out previously, it is necessary for a receiver to synchronize time and detect preambles properly in a received PLC signal so that data can be recovered without errors. This is particularly relevant where a robust detection performance is required in the presence of impulsive noise and frequency-selective channels that afflict most PLC environments.

Preamble detection according to the teachings herein advantageously exploits the repetitions in a preamble portion (e.g., legacy and/or MIMO preamble portions) to perform delayed correlation and/or cross-correlation operations in a hybrid detection scheme as will be set forth below. The delayed correlation involves correlating the received stream with a delayed version of itself, while the cross-correlation involves correlating the received stream with the known preamble sequence. A delayed correlation detector may be implemented relatively easily through recursive computations (i.e., low implementation complexity). In addition, the delayed correlation detector performance is typically not affected by the cyclic shift applied to the preamble sequence, as the repetitions within the preamble remain identical after applying the cyclic shift. On the other hand, a cross-correlation detector has a better performance than the delayed correlation detector but requires a higher degree of computational complexity. Further, a cross-correlation detector may experience some performance degradation due to the presence of non-zero CS amounts in a preamble sequence. It should be appreciated that in such a scenario multiple peaks might appear at different locations, spaced according to the relative CS values across the transmit phases, instead of a single peak in the case of zero cyclic shift. The additional peaks can give rise to a degradation of the detection signal-to-noise ratio (SNR), which can adversely affect the detection performance.

FIG. 8 depicts a block diagram of an example preamble detector 800 according to an embodiment that involves a hybrid detection scheme wherein both delayed correlation and cross-correlation detectors are employed. It should be appreciated that the hybrid preamble detection technique disclosed herein provides flexibility in obtaining the desirable tradeoff between performance and complexity. Broadly, a delayed correlation detector 804 is used as the first detection phase/stage to provide a rough estimate for the preamble start that can be verified and refined through a second detection phase/stage that adopts a cross-correlation detector 812. Accordingly, the hybrid detection scheme of the present disclosure takes advantage of the relatively low degree of complexity of the delayed correlation detector and its robustness to non-zero cyclic shifts while exploiting the robust detection performance of the cross-correlation detector to impulsive noise and frequency-selective channel conditions of a PLC network. As shown in FIG. 8, the delayed correlation detector 804 is configured to process a received signal 802, preferably in its entirety, to decide on the presence/absence of a preamble, and find a rough estimate of the preamble start 806, if the presence of a preamble is detected. Thereafter, in case of preamble detection, the rough estimate of preamble start 806 along with a certain search range 808 around the estimated preamble start are used to specify a search window 810 that is fed as the input signal to a cross-correlation detector 812 that reconsiders the decision taken by the delayed correlation detector 804 and refines the initial/rough estimate of the preamble start 806. The search range of the second stage of the hybrid scheme is a key parameter that characterizes the performance/complexity tradeoff of the hybrid correlation scheme. Specifically, the higher the search range, the better the detection performance and the higher the complexity.

Figure 12:
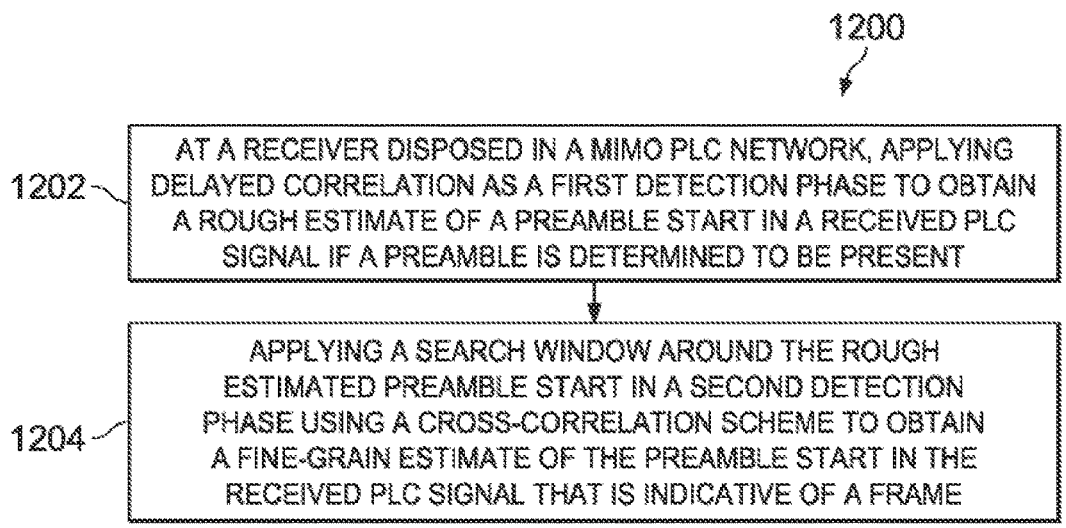
FIG. 12 is flowchart of an example preamble detection method for use with an embodiment of the preamble detector of FIG. 8.

Taking reference to FIG. 12 in conjunction herewith, an embodiment of a hybrid detection process 1200 sets forth the steps, acts and/or blocks 1200 that may take place at a PLC receiver, e.g., a MIMO device or a SISO device, for detecting either a legacy preamble sequence or a MIMO preamble sequence in a PLC data signal. At block 1202, delayed correlation is applied as a first detection phase to obtain or otherwise determine a rough estimate of a preamble start in the received PLC signal (i.e., an initial estimate), provided a preamble is determined to be present. At block 1204, a search window around the rough estimated preamble start is applied in a second detection phase using a cross-correlation scheme to obtain or otherwise determine a fine-grain estimate of the preamble start in the received PLC signal (i.e., final estimate) that is indicative of a frame. It should be appreciated that the hybrid preamble detector 800 and associated detection process 1200 may be advantageously implemented in a PLC device such as receiver 600B described hereinabove.

Additional details regarding embodiments of a delayed correlation detector and a cross-correlation detector operative in the hybrid preamble detector 800 are set forth immediately below.

Figure 13:
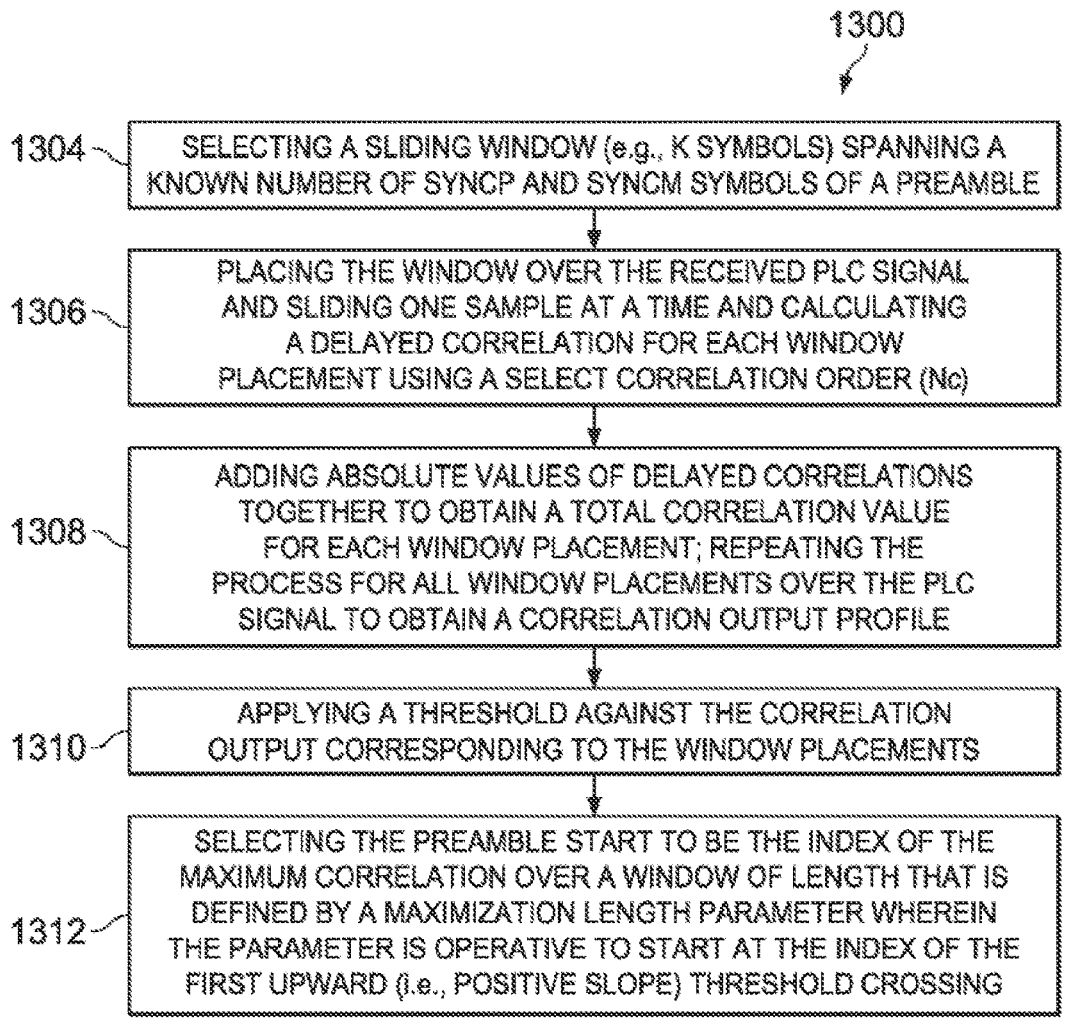
FIG. 13 is flowchart of an example delayed correlation method for use with an embodiment of the preamble detector of FIG. 8.

FIGS. 9A-9B and 10A-10B illustrate and exemplify a delayed correlation detection scheme. Example plots of delayed correlation profiles for determining an initial estimate of the preamble start in a MIMO signal having a preamble with known number of symbols are shown in FIGS. 11A-11B. A flowchart of an example delayed correlation method for use with an embodiment of the preamble detector of FIG. 8 is shown in FIG. 13.

Reference numeral 900A in FIG. 9A refers to a sliding window scheme used in computing delayed correlation with respect to a received signal 902 having a preamble of 9 symbols. As shown, a sliding window 904 of 9 symbols (spanning 8 SYNCP symbols and one full SYNCM symbol) slides over the received stream 902 one sample at a time. For example, reference numeral 906 refers to the window that has been moved by one sample. Within each window placement, each symbol is correlated with a specified number ($N_C$) of symbols immediately preceding it (i.e., its correlation order). By way of illustration, reference numerals 908-1 to 908-$N_C$ refer to correlation orders 1, 2, . . . , $N_C$. The total number of delayed correlations per window placement, denoted as L, can be calculated according to the below equation:

$$L = (K-1)N_C - \sum_{j=1}^{N_C - 1} j$$

where K is the number of symbols within the sliding window, which is set to 9 in the illustrative example. The absolute values of the L delayed correlations are added together to compute the total correlation value corresponding to the current window placement. FIG. 9B depicts a circuit block 900B that applies absolute value functions 922-1 to 922-L to L correlations 920-1 to 920-L obtained per window placement, which are provided to a summation block 924 for generating a total correlation value 926.

Figure 10A:
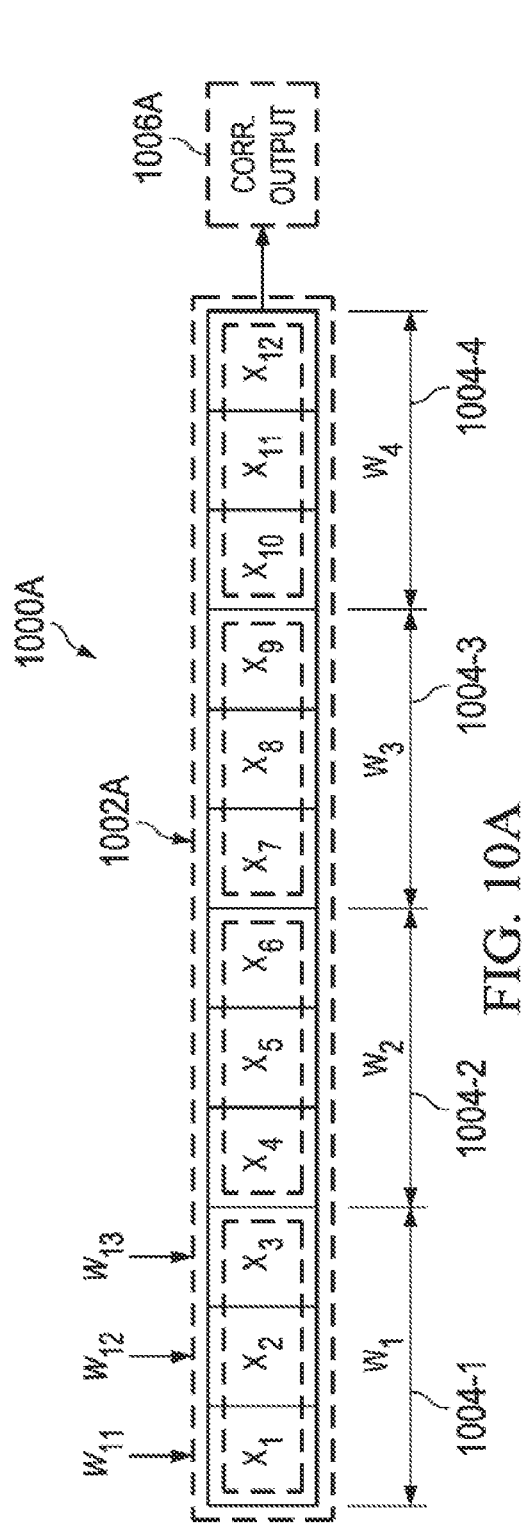
Figure 10B:
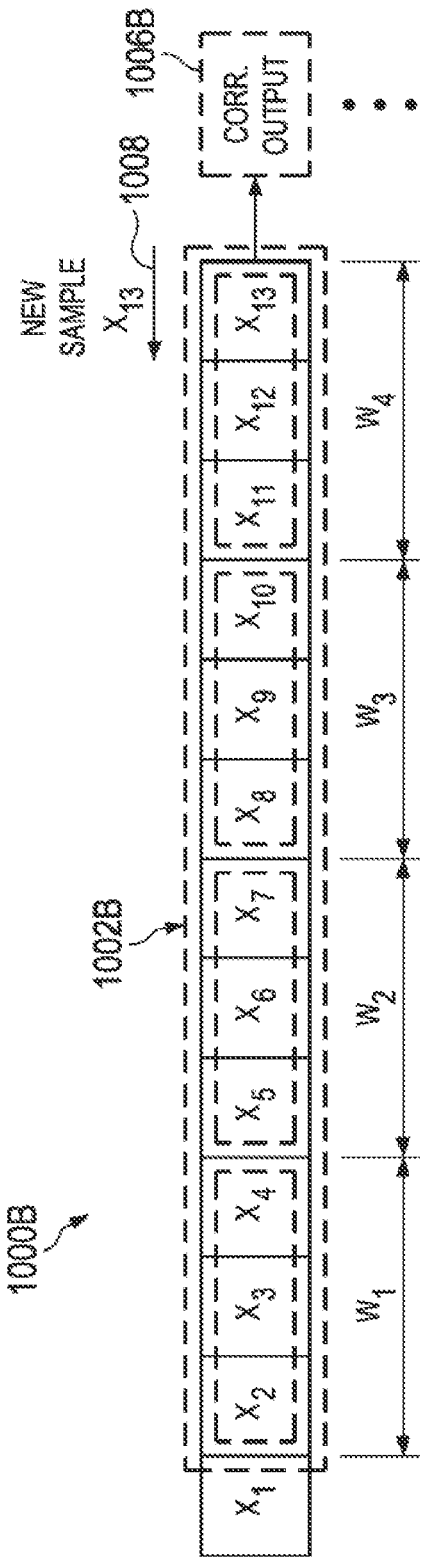
Figure 11A:
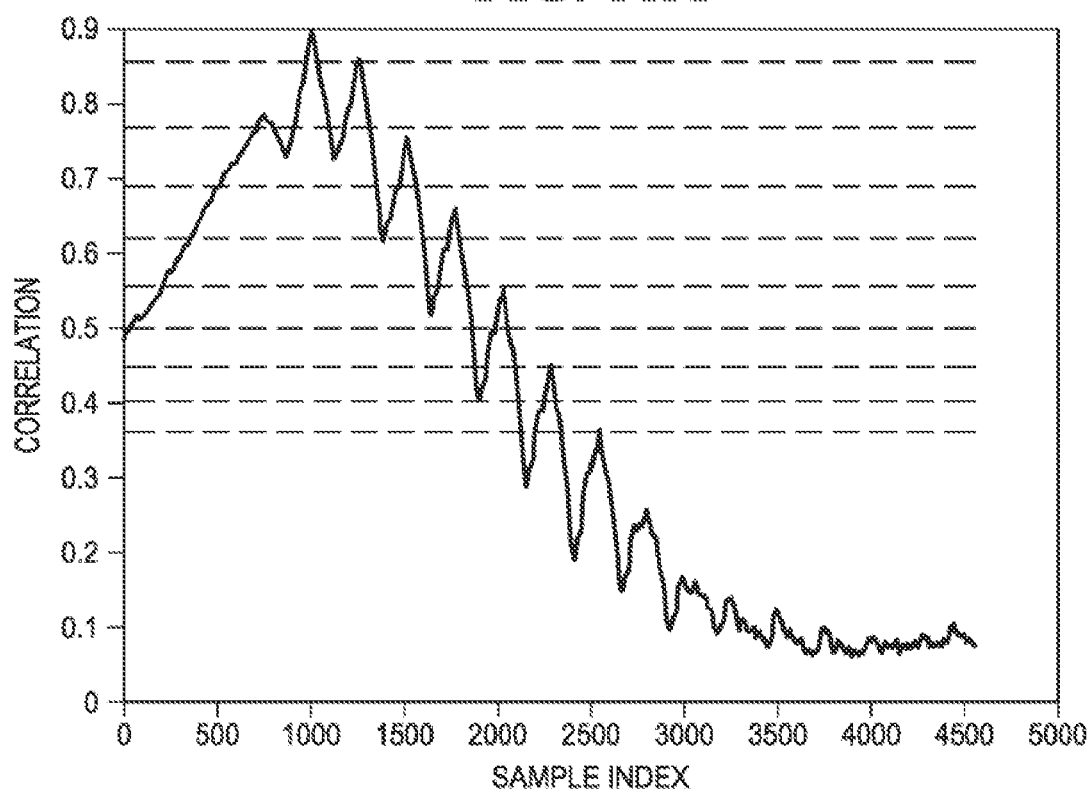
FIGS. 11A and 11B depict example plots of delayed correlation profiles for determining an initial estimate of the preamble start in a MIMO signal according to an embodiment of a delayed correlation scheme.
Figure 11B:
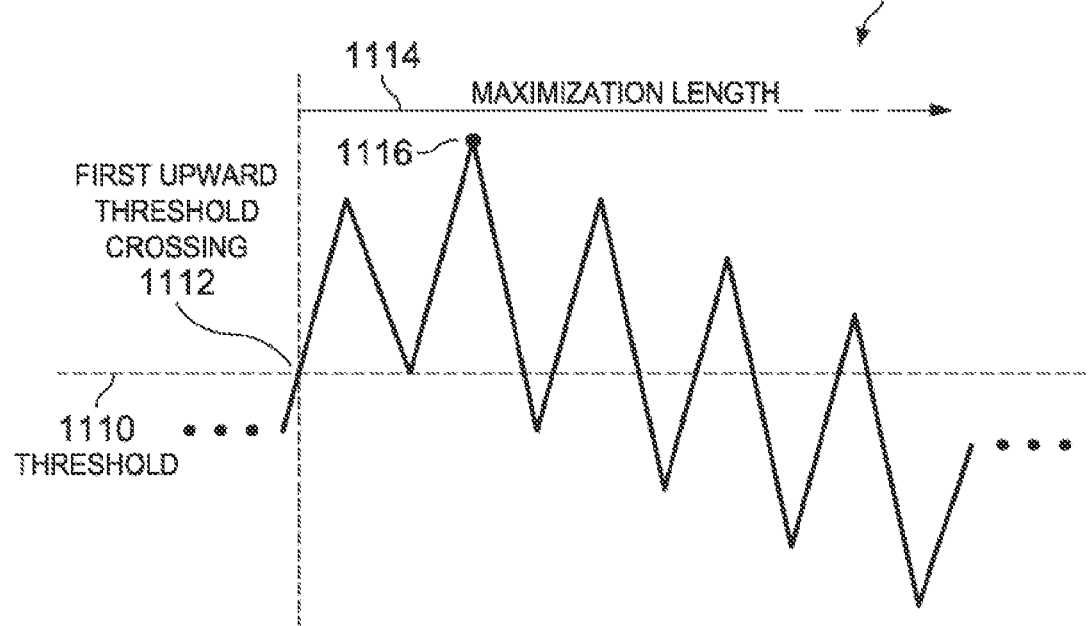

A simplified example for illustrating the calculation of a delayed correlation profile is depicted in FIGS. 10A-10B. In this example, the number of symbols within a sliding window (outer window) 1002A is set to 4 symbols $W_1$ to $W_4$, the numbers of samples per symbol (inner window) is set to 3 samples $X_1$ to $X_3$, and the correlation order, $N_C$, is set to 2. Hence, the total number of correlations per window placement, L, can be calculated to be 5. As shown in FIG. 10A, in the first step, each symbol, except for the first and second symbols (the $1^{st}$ symbol being correlated with none and the $2^{nd}$ symbol being correlated with only one preceding symbol), is correlated with its two preceding symbols (e.g., on a sample by sample basis) and the absolute values of the resulting correlations are added together to obtain $D_1$, which is the total delayed correlation 1006A corresponding to the first window placement. The correlation equations for L=5 correlations possible (i.e., $W_4$ to $W_3$; $W_4$ to $W_2$; $W_3$ to $W_2$; $W_3$ to $W_1$; and $W_2$ to $W_1$) and the total correlation $D_1$ are set forth below:

$$C_1 = \sum_{j=1}^{3} W_{2j} W_{1j}$$

$$C_2 = \sum_{j=1}^{3} W_{3j} W_{2j}$$

$$C_3 = \sum_{j=1}^{3} W_{3j} W_{1j}$$

$$C_4 = \sum_{j=1}^{3} W_{4j} W_{3j}$$

$$C_5 = \sum_{j=1}^{3} W_{4j} W_{2j}$$

$$D_1 = \sum_{i=1}^{L} |C_i|$$

In the second step shown in FIG. 10B, the window 1002B slides over the received stream with one sample ($X_{13}$) 1008 inserted and one sample ($X_1$) dropped, and the same calculations may be performed to produce $D_2$, which is the total correlation 1006B for the second window placement, as calculated according to the following equation:

$$D_2 = \sum_{i=1}^{L} |C_i|$$

This processing is repeated for each window placement to obtain a delayed correlation profile over the received stream. An example of the delayed correlation profile 1100A is shown in FIG. 11A, wherein the X-axis represents the sample index and the Y-axis represents correlation values, with various horizontal lines representing different threshold levels. As depicted in FIG. 11B, a select threshold 1110 is applied over the correlation output and the preamble start is selected to be the index of where a maximum correlation occurs (e.g., maxima 1116) over a window of length that is defined by a maximization length parameter 1114 and starts at the index of the first upward threshold crossing 1112. That is, the first upward threshold crossing 1112 defines the beginning of a window within which a local maximum may be found.

Taking reference to FIG. 13, shown therein is an embodiment of a delayed correlation process 1300 that may be effectuated at a receiver in accordance with the teachings hereinabove. At block 1300, a sliding window (e.g., K symbols) spanning a known number of SYNCP and SYNCM symbols of a preamble sequence is selected. At block 1306, the sliding window is placed over the received PLC signal and moved one sample at a time for calculating a delayed correlation for the symbols for each window placement using a select correlation order ($N_C$). That is, within each window placement, each symbol is correlated with its preceding $N_C$ symbols, preferably per samples. Thereafter, absolute values of delayed correlations are added together to obtain a total correlation value for each window placement (block 1308), which is repeated for the window placements over the received stream to obtain a correlation profile. A predetermined threshold is applied against the correlation output profile corresponding to the window placements (block 1310). A rough/initial estimate of a preamble start is selected to be the index of the maximum correlation over a window of length that is defined by a maximization length parameter that is operative to start at the index of the first upward (i.e., positive slope) threshold crossing (block 1312).

Figure 14:
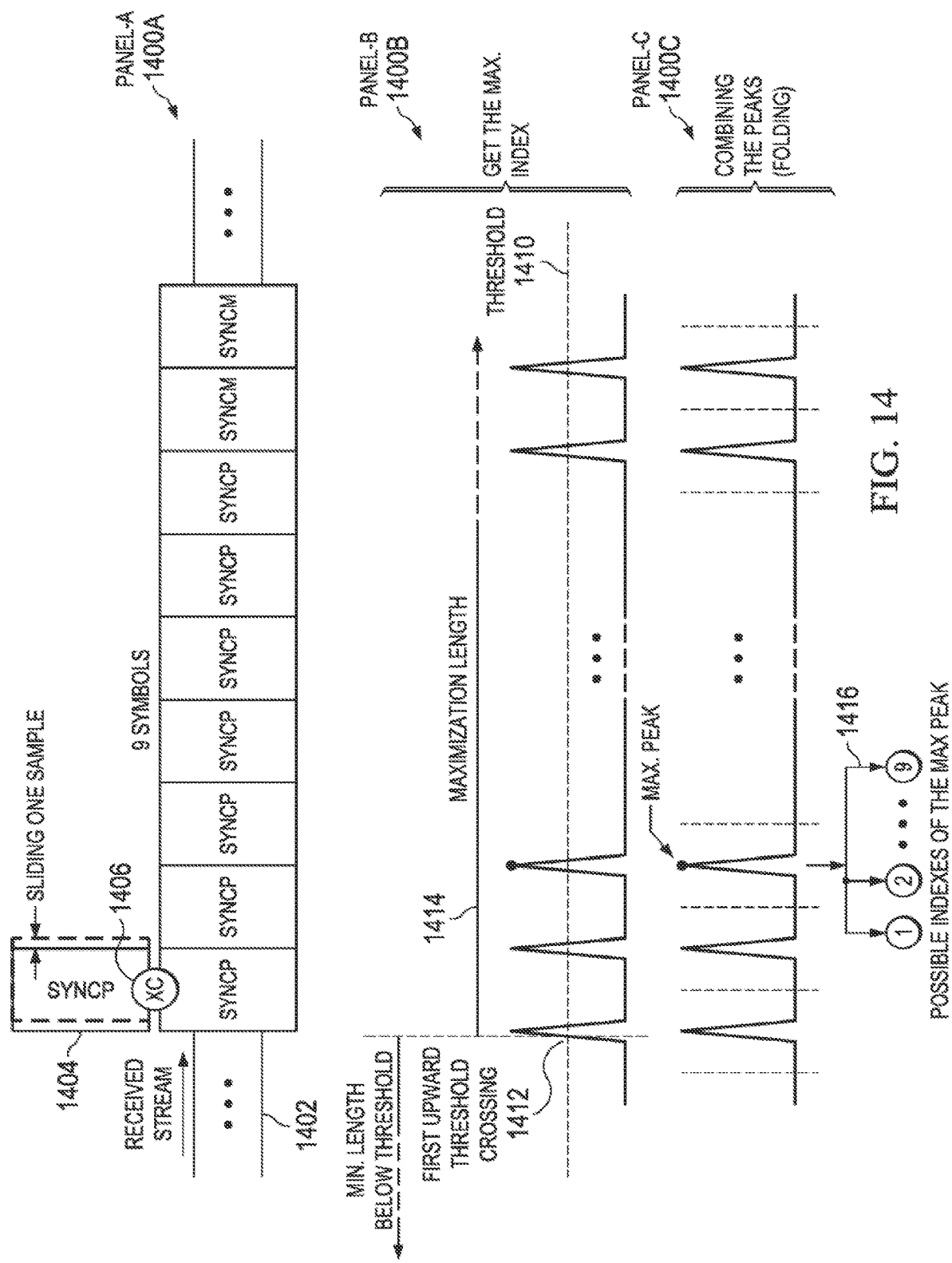
FIG. 14 illustrates an example cross-correlation scheme for determining a final estimate of a preamble start as part of an embodiment of the preamble detector of FIG. 8.
Figure 15A:
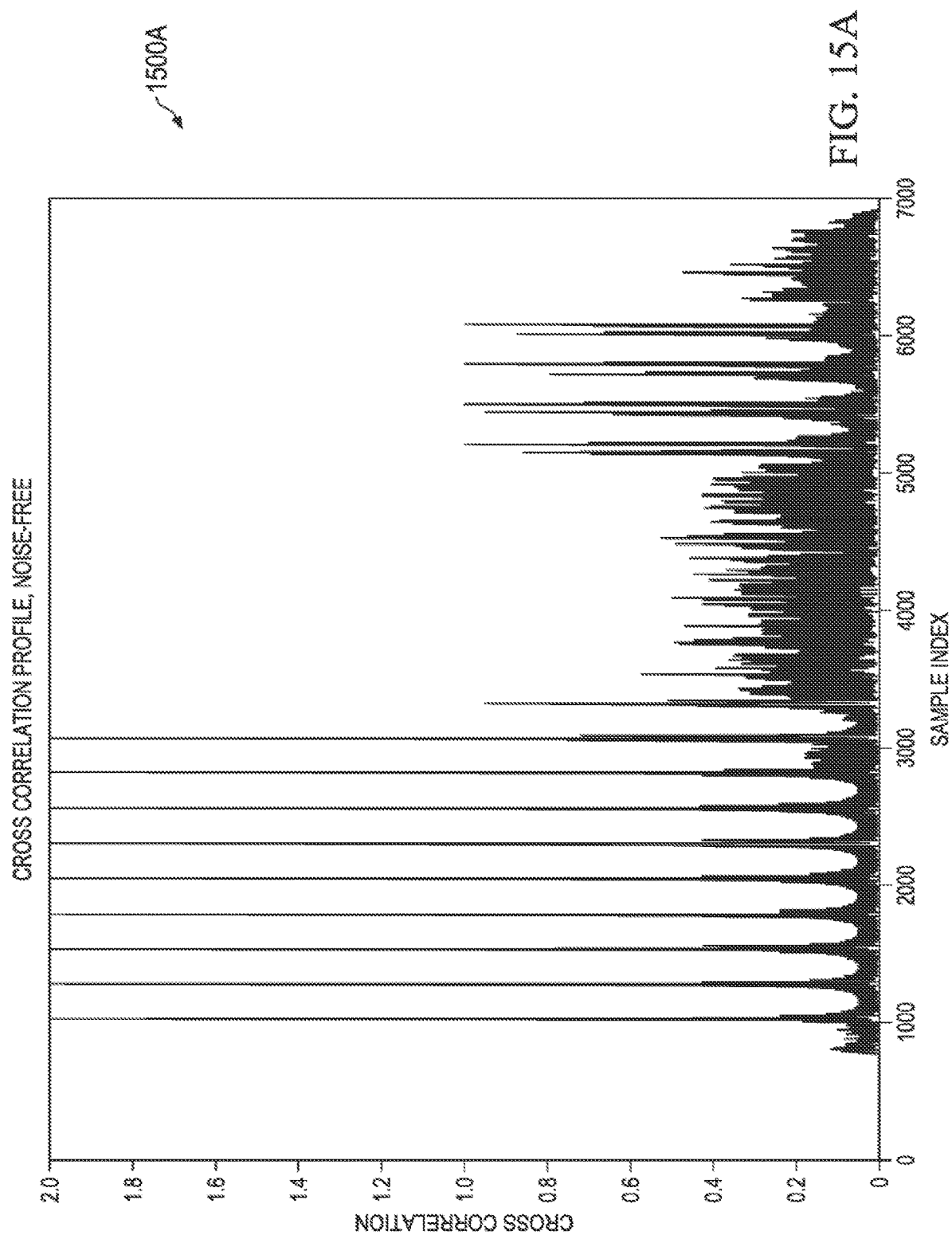

FIG. 14 illustrates an example cross-correlation scheme for determining a final estimate of a preamble start as part of an embodiment of the preamble detector of FIG. 8. Example plots of cross-correlation profiles without and with data peak folding are shown in FIGS. 15A-15B corresponding to an embodiment of the cross-correlation scheme of FIG. 14. A flowchart of an example cross-correlation method for use with an embodiment of the preamble detector of FIG. 8 is shown in FIG. 16.

As shown at Panel-A 1400A in FIG. 14, the known preamble sequence is correlated with a received stream 1402, where the preamble is correlated with a window 1404 that slides over the received stream one sample at a time, with a cross-correction (XC) operation 1406 taking between the window and received symbols. The correlation output is shown in Panel-B 1400B to have 9 peaks located at the start indexes of the 8 SYNCP and the SYNCM symbols. A threshold value 1410 is applied over the cross correlation profile and the maximum correlation is calculated or otherwise determined over a window that starts at the first upward threshold crossing 1412 of a length that is determined by the maximization length parameter 1414. It should be appreciated that the maximum peak selected or otherwise previously determined in the foregoing operation corresponds to one of the 9 symbols. In order to determine the symbol index associated with the maximum detected peak, in Panel-C 1400C, a symbol interval 1416 of a specified length (e.g., an interval comprising 9 symbols) around the maximum peak for each index assumption is folded by adding the subintervals of one symbol length each are added together (i.e., folded) to obtain a total of 9 folded-correlation windows that correspond to the 9 indexes. Thereafter, a maximization operation is performed over the respective maxima of the 9 folded-correlation windows to detect the most likely window index. Within the selected window, the index with the maximum correlation is selected and properly translated to obtain a final estimate for the preamble start, given the maximum window index. Examples for the cross correlation profiles before and after folding are shown in FIGS. 15A and 15B at reference numerals 1500A and 1500B, where the X-axis refers to sample index and the Y-axis refers to cross-correlation and combined cross-correlation values, respectively. In FIG. 15B, the number of possible indexes for the maximum peak is from 1 to 8 only as, in this case, the index of the maximum peak has only 7 previous symbols referred from the receiver start index. In such a scenario, there is no possibility that the maximum peak corresponds to the 9-th symbol. As shown in FIG. 15B, the maximum folded-window 1502 corresponds to the 8-th symbol and hence the preamble start would be the index of the maximum peak within the 8-th folded window.

Figure 16:
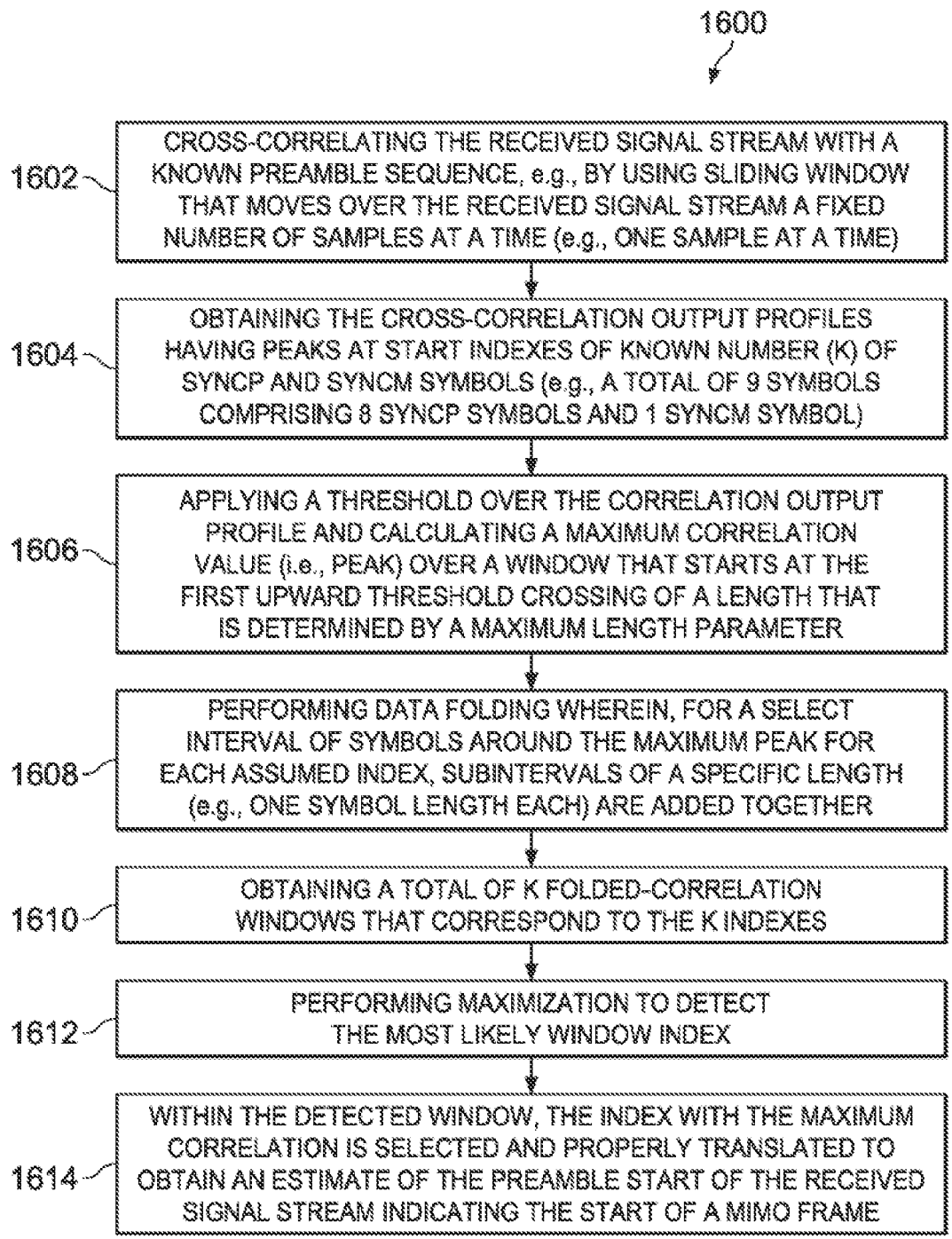
FIG. 16 is flowchart of an example cross-correlation method for use with an embodiment of the preamble detector of FIG. 8.

FIG. 16 depicts an embodiment of a cross-correlation process 1600 that may be effectuated at a receiver in accordance with the teachings hereinabove. At block 1602, a received signal stream is cross-correlated with a known preamble sequence (e.g., a legacy preamble), by using a sliding window that moves over the received signal stream a fixed number of samples at a time (e.g., one sample at a time), which sliding window may be determined responsive to information from a delayed correlator including an initial estimate and a search range. A cross-correlation output profile is obtained (block 1604) that includes peaks at start indexes of known number (K) of SYNCP and SYNCM symbols (e.g., a total of 9 symbols comprising 8 SYNCP symbols and 1 SYNCM symbol). A predetermined threshold is applied over the correlation output profile and a maximum correlation value (i.e., peak) is determined over a window that starts at the first upward threshold crossing of a length that is determined by a maximum length parameter (block 1606). A folding operation is then performed wherein, for a select interval of symbols around the maximum peak for each index assumed to be the maximum, subintervals of a specific length (e.g., one symbol length each) are added together (block 1608), whereby a plurality of folded-correlation windows (e.g., K windows) are obtained (block 1610). A maximization operation is performed to detect the most likely window index (block 1612). Within the detected window, the index with the maximum correlation is selected and properly translated to obtain a final estimate of the preamble start of the received signal stream indicating the start of a MIMO frame (block 1614).

One skilled in the art will recognize upon reference hereto that a potential detection error that can occur in a preamble detection process is the (erroneous) decision of the start of the second SYNCP as the preamble start (instead of the first SYNCP), especially when a severe channel condition (e.g., noise) hits one symbol within the preamble. For instance, consider scenario 1700A depicted in FIG. 17A, where the second SYNCP symbol is detected as the preamble's start symbol, indicating an erroneous preamble window 1704 rather than the correct preamble window 1702. In order to resolve this boundary error issue, embodiments herein exploit that the 9-th symbol that corresponds to the full SYNCM symbol has a negative correlation, as shown at reference numeral 1706. In addition, the 10-th symbol also has a negative correlation, with half the power, that results from the correlation of the half SYNCM symbol with known preamble sequence, as shown at reference numeral 1708. Accordingly, in a boundary error scenario where the preamble boundary is shifted by one symbol, subtracting the symbols separated by the 8 (the 9-th symbol) and 9 (the 10-th symbol) symbol intervals from the preamble start symbol multiplies the correlation of the preamble start symbol by a certain amount under ideal conditions. Likewise, performing similar subtraction operations starting with the incorrect second symbol also yields a correlation having a multiplicative factor under ideal conditions. For example, in the first case, the correlation of the preamble start symbol may be 2.5× whereas the correlation in the latter case may be 1.5× in ideal conditions. However, if a symbol boundary error happens in a case where a severe channel hits the first symbol, the result of the comparison between the two correlation values might still come in favor of the latter value. Denoting the two correlation values as X and Y, respectively, obtained after corresponding subtraction operations, it can be seen that in the case of correct detection, the first symbol should be preceded by an inactivity period, and consequently the ratio X/Y should be very small. Hence, if the ratio X/Y is less than one, but still has a considerable value that is greater than a certain threshold, then such a case may correspond to a false detection of the second SYNCP symbol as the preamble start. To resolve this issue, embodiment 1700B shown in FIG. 17B provides a threshold comparator 1730 that can be optimized via simulations, which takes the output of a ratio determination block 1728 that computes a ratio between x and Y correction values. Correlations of respective preamble symbol start conditions, i.e., X value 1724 and Y value 1726, corresponding to $1^{st}$ symbol and $2^{nd}$ symbol starts, respectively, are determined responsive to respective symbol subtraction operations 1720, 1722. Optimized threshold comparator 1730 is configured to provide a determination to a boundary estimator 1732 wherein if the ratio is greater than the threshold then the decision would be in favor of correcting the initial preamble start by subtracting one symbol length. Otherwise, the initial estimate of the preamble start is kept unchanged. It should be apparent that similar boundary correction operations may also be performed with respect to other symbols of a preamble that are falsely detected as the preamble start, depending on where the peaks of positive and negative correlations occur and their relative distances/positions.

Figure 17A:
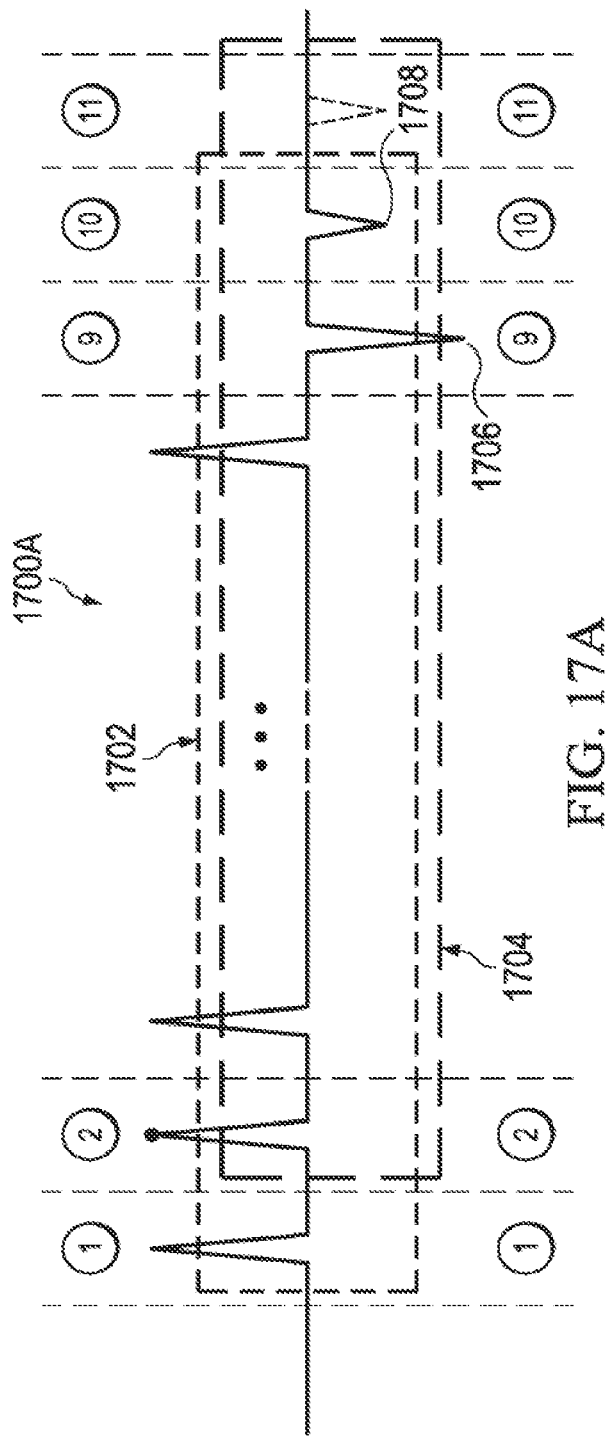
FIGS. 17A and 17B illustrate a boundary correction scheme for the preamble symbols according to an embodiment.
Figure 17B:
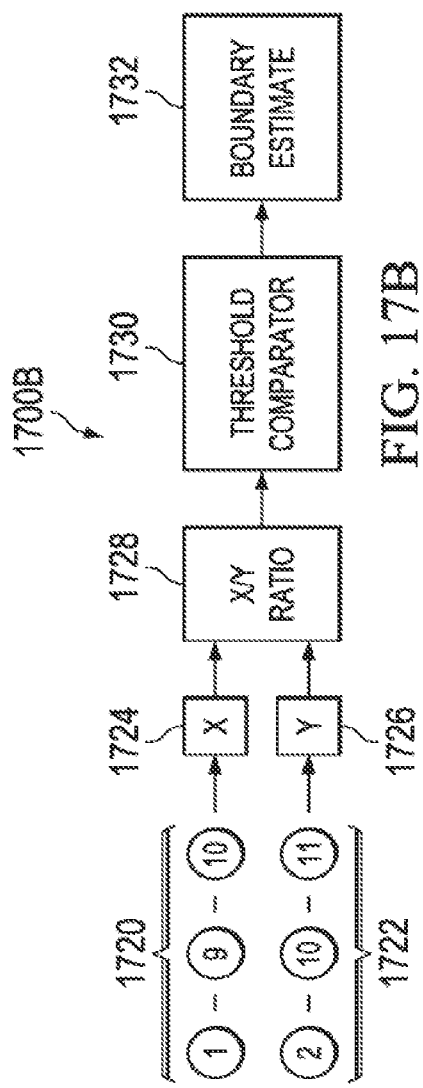
Figure 18:
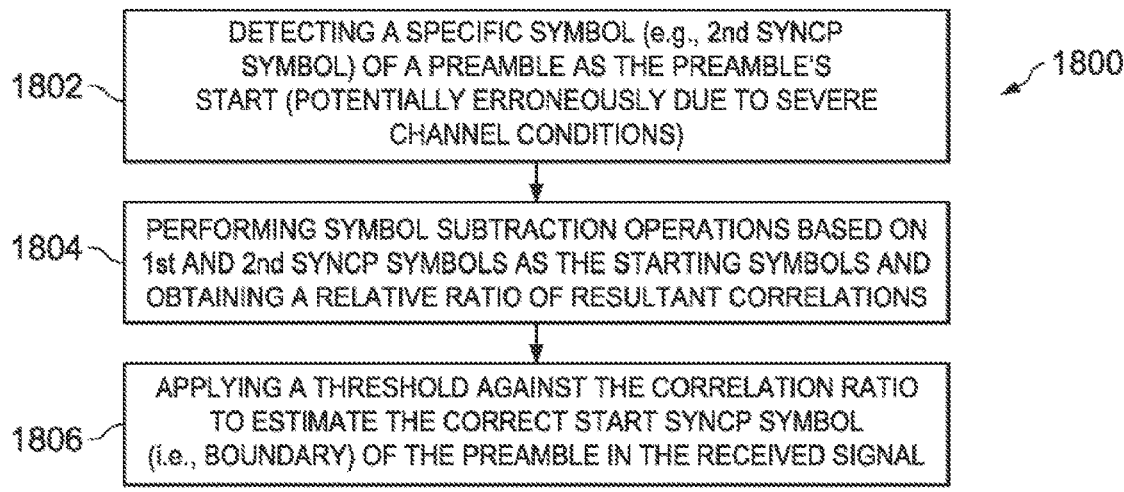
FIG. 18 is flowchart of a method of symbol boundary correction according to an embodiment of the scheme of FIGS. 17A and 17B.

FIG. 18 is flowchart of a method of symbol boundary correction 1800 according to an embodiment of the scheme of FIGS. 17A and 17B. At block 1802, a particular symbol (e.g., the $2^{nd}$ SYNCP symbol) of a preamble is detected as the preamble's start in a received PLC signal (potentially erroneously due to severe channel conditions). Suitable symbol subtraction operations are performed based on the correct and incorrect symbols (e.g., $1^{st}$ and $2^{nd}$ SYNCP symbols, respectively) as the starting symbols and correlation values corresponding to respective preamble start symbols are obtained (block 1804). A ratio of the respective correlation values is determined (block 1804), against which a threshold is applied to estimate the correct start symbol (i.e., the boundary) of the preamble in a received signal (block 1806).

Figure 19A:
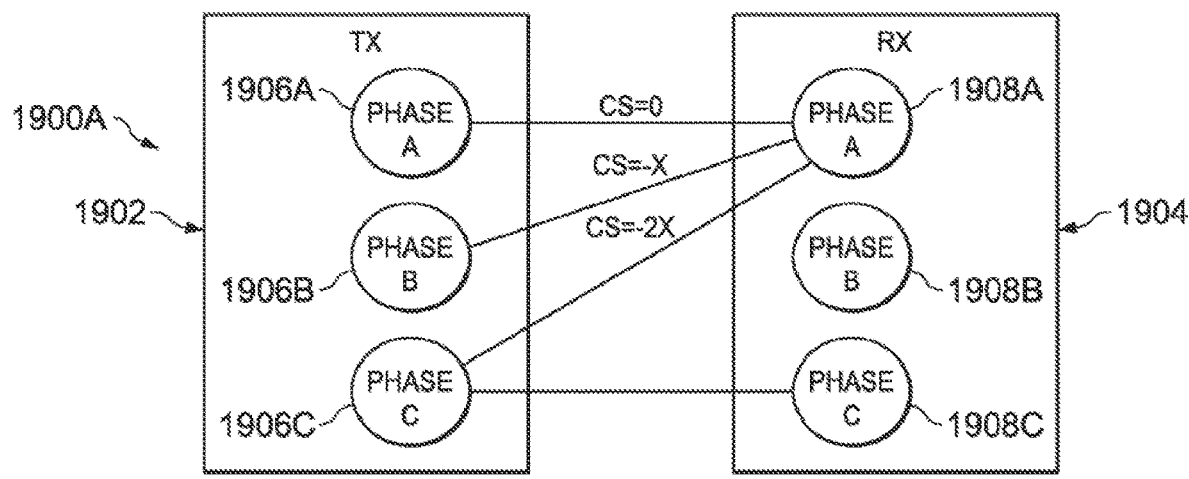
FIGS. 19A and 19B illustrate a cyclic shift (CS) selection scheme in an example MIMO PLC network according to an embodiment.
Figure 19B:
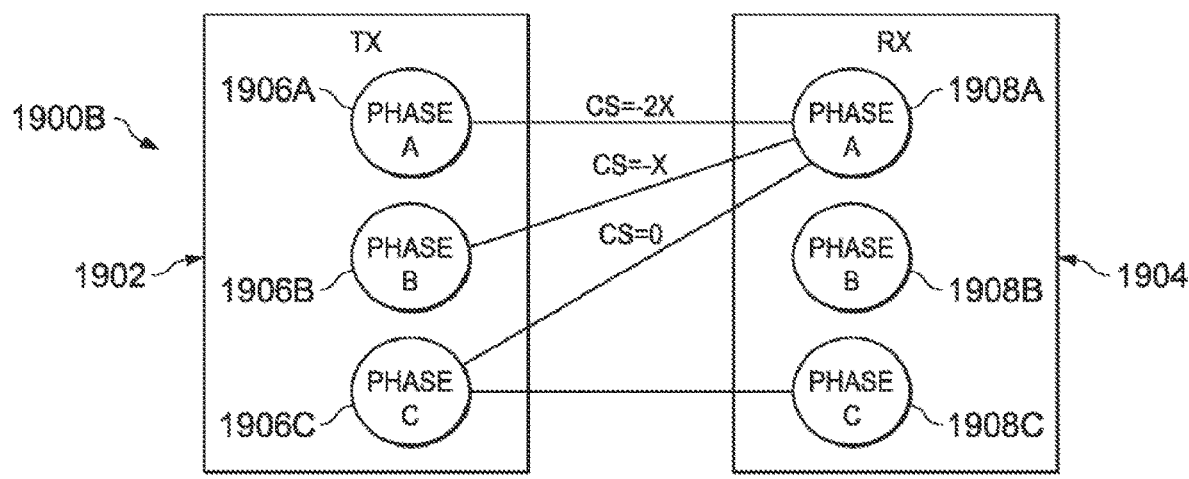

As one skilled in the art will recognize, various embodiments relating to MIMO frame generation and preamble structure employ CS diversity in the transmission of the preamble and payload data to provide, inter alia, backward compatibility for legacy SISO NB-PLC devices. Furthermore, CS may be advantageously introduced in the transmission of the MIMO frames wherein different CS amounts are applied to L-Preambles and/or M-Preambles transmitted from different phases in order to avoid unintended beamforming that can result in null reception at receivers due to destructive combining. It should be recognized, however, that the CS vector selected over the transmit phases may also result in destructive combining for some channel configurations. Accordingly, further embodiments herein provide a system where a preamble portion (i.e., the L-Preamble and/or M-Preamble portions) is transmitted using an initial default CS vector and the communication path is monitored for reception of an acknowledgement signal (e.g., an ACK frame) from the receiver. If a timeout occurs without receiving an ACK, the transmitter is configured to retransmit the signal with either a zero CS vector or an interleaved version of the initial CS vector or some other variation of the CS vector that may help mitigate the channel conditions while still maintaining the desired diversity. FIGS. 19A-19B illustrate a CS selection scheme that may be implemented in a MIMO transmitter (e.g., transmitter 600A) in an example MIMO PLC network according to an embodiment. Reference numeral 1900A refers to a MIMO channel configuration with a transmitter 1902 operative to effectuate three transmit phases 1906A-1906C that are received at two ports 1908A and 1908C of a receiver 1904. The initial CS vector is shown as [0; −X; −2X] wherein CS amounts [0]; [−X] and [−2X] are applied to the three transmit phases 1906A-1906C, respectively. Upon failing to receive an ACK and having timed out, transmitter 1902 interleaves or otherwise rearranges the CS vector as [−2X; −X; 0] applied to the transmit phases 1906A-1906C, respectively, in order to provide a different channel for receiver 1904, as illustrated in FIG. 19B.

Figure 20:
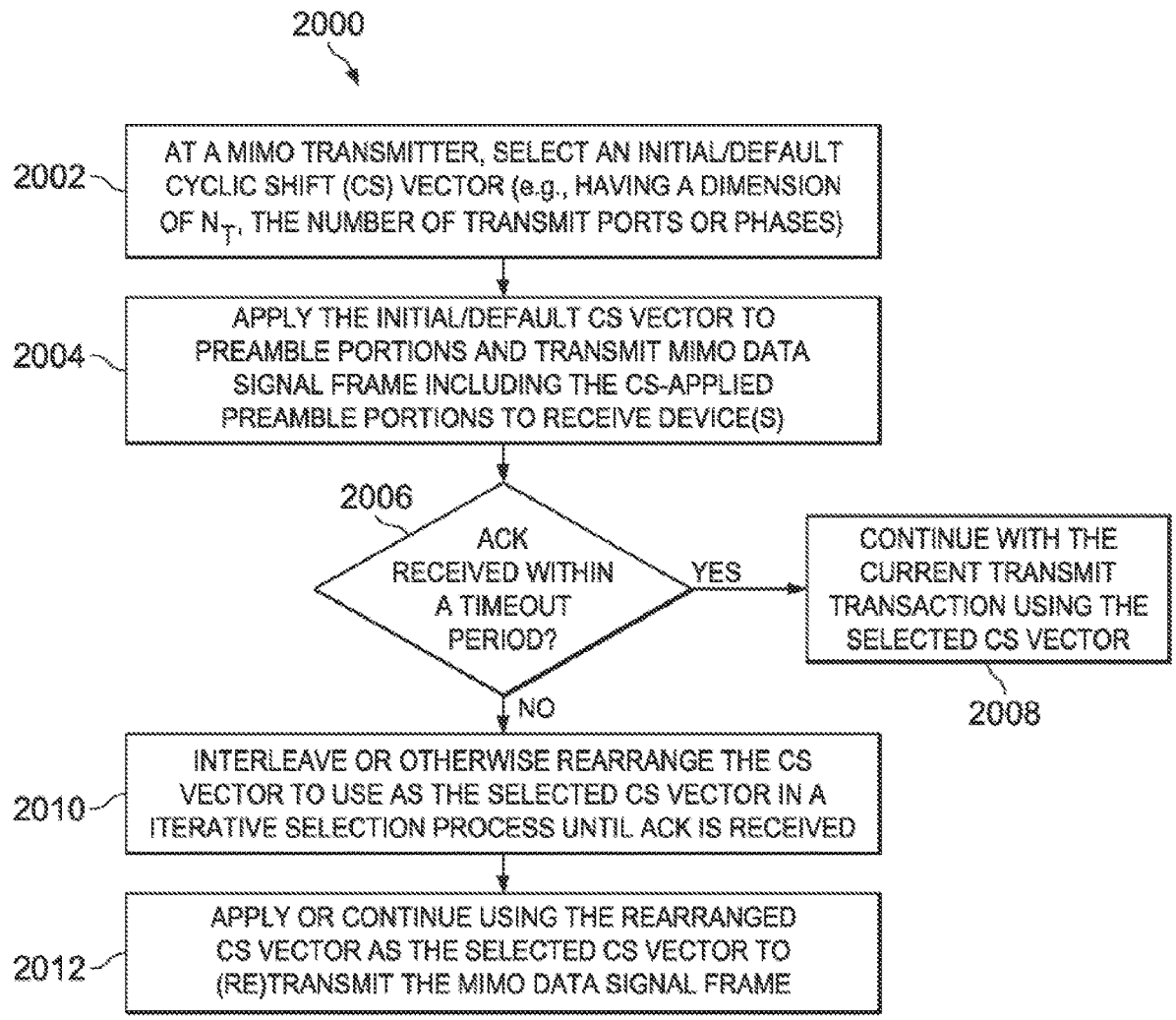
FIG. 20 is flowchart of a CS selection method operative according to an embodiment of the scheme of FIGS. 17A and 17B.

FIG. 20 is flowchart of a CS selection method operative corresponding to an embodiment of the scheme of FIGS. 19A-19B. At a MIMO transmitter, an initial/default CS vector (e.g., having a dimension of $N_T$, the number of transmit ports or phases) is selected or otherwise configured (block 2002). The initial/default CS vector is applied to a preamble portion (e.g., L-Preamble and/or M-Preamble portions), whereupon a MIMO signal frame comprising the CS-applied preamble portions or at least a portion thereof is transmitted to receive device(s), as set forth at block 2004. A determination is made whether an ACK is received within a timeout period (block 2006). If so, the transmitter continues with the current transmit transaction using the selected CS vector (block 2008). On the other hand, if no ACK is received within a timeout period, the CS vector values are interleaved or otherwise rearranged, which are applied to the preamble sections that are retransmitted. The CS interleaving/rearrangement process may take place iteratively until an ACK is received and a CS vector is selected in the iterative process (block 2010). Thereafter, the selected CS vector that has been suitably rearranged is applied or continued for the (re)transmission (block 2012).

It should be realized that when MIMO devices as well as legacy SISO devices are disposed in a mixed-mode PLC network implementation, the collision rate between the MIMO devices and legacy devices should be minimized as much as possible while still allowing access to the physical medium using a standardized technique such as CSMA. Accordingly, one of the goals of backward compatibility of embodiments of a MIMO frame structure with the legacy frame structure is to enable the legacy devices to determine whether the channel is busy or idle. During a MIMO packet transmission, if the legacy device is able to detect the L-Preamble and decode the FCH, it will be able to correctly determine the length of the MIMO packet and will back off for the time of the MIMO packet transmission. On the other hand, if the legacy device was able to detect the L-Preamble, but was not able to decode the FCH correctly, a CRC failure would occur. Hence, in order to reduce the rate of possible collisions between the MIMO and the legacy PLC devices, intentional errors can be inserted into the legacy part of the FCH within the transmitted frame from the MIMO PLC device, which ensures CRC failure at the legacy PLC device, thereby leading to a maximum back-off length instead of having a random back-off period. In one embodiment, the back-off time/length may be preconfigured, predetermined or otherwise provided specific to a particular implementation.

Figure 21:
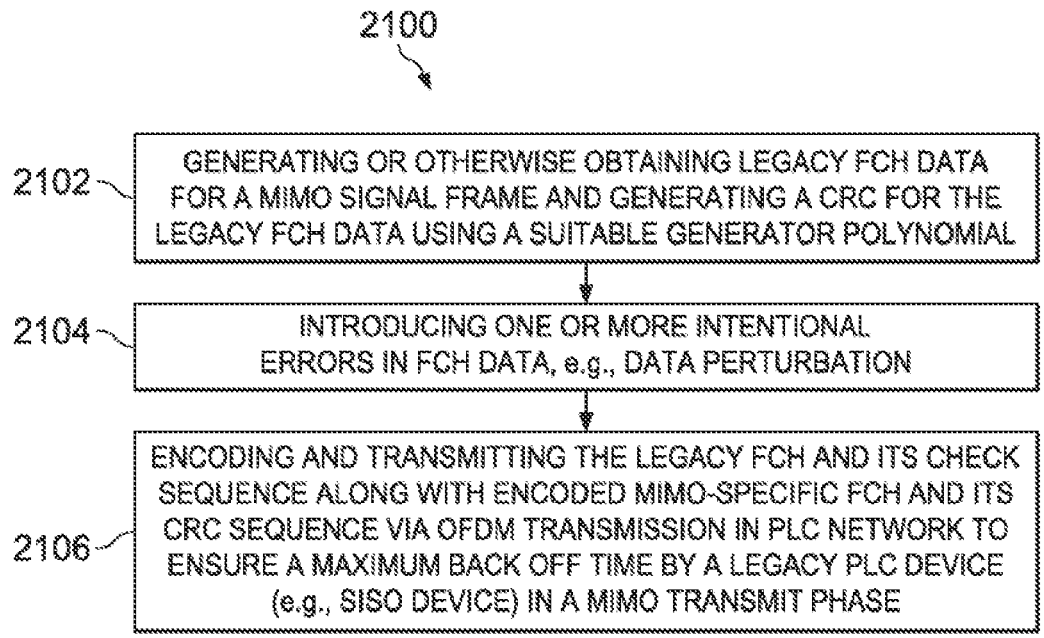
FIG. 21 is flowchart of a collision rate reduction method according to an embodiment.

FIG. 21 is flowchart of a collision rate reduction method 2100 according to an embodiment that may be implemented as part of a PLC device, e.g., transmitter 600A shown in FIG. 6A. At block 2102, the transmitter is operative to obtain or otherwise generate legacy FCH data and compute a CRC sequence therefor. As described previously, the legacy FCH data populates an FCH portion of a MIMO data signal frame that includes MIMO-compliant FCH data, a M-Preamble portion and a payload data portion. A perturbation is introduced in at least a portion of the legacy FCH data in order to insert one or more intentional errors pieces of the legacy FCH data (block 2104). In one implementation, the legacy FCH data may be perturbed so as to maximize a Hamming distance between the perturbed and unperturbed FCH data. In other implementations, the legacy FCH data may be disturbed by inverting all or a portion of the bits, adding extra bits, deleting one or more bits, and the like. At block 2106, the MIMO data signal frame that includes the perturbed legacy FCH data and the CRC sequence of unperturbed legacy FCH data is encoded and transmitted, wherein the CRC sequence is configured to fail at a legacy PLC receiver device in order to ensure a predetermined back-off time by the legacy PLC receiver device when it receives the MIMO data signal frame via the PLC network. It should be apparent that the foregoing methodology requires only inserting errors in the transmitted frame from the MIMO PLC device and does not require substantial changes in either the transmitter or the receiver portion of a legacy PLC device.

Figure 22:
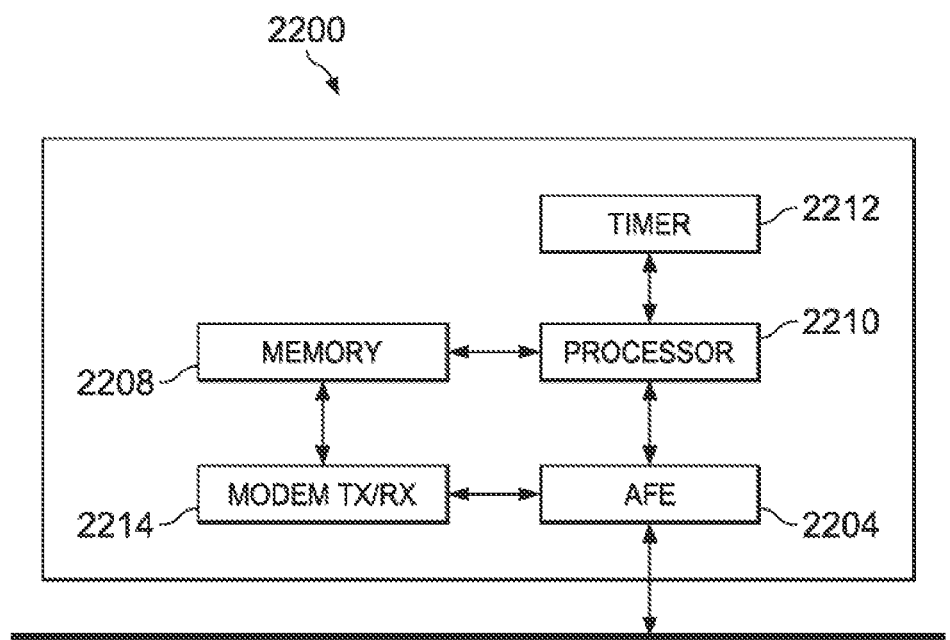
FIG. 22 is a block diagram of an example PLC device wherein one or more embodiments of the present patent application may be practiced.

FIG. 22 is a block diagram of an example PLC device 2200 wherein one or more embodiments of the present patent application may be practiced. PLC device 2200 comprises a modem 2214 that may include parts of at least some of the transmit/receive embodiments described hereinabove, e.g., FIGS. 4A-4B and/or FIGS. 6A-6B. Although not specifically shown, it should be appreciated that modem 2214 may contain one or more processors, including digital signal processors (DSPs), associated memory, and other circuitry in realizing one or more aspects set forth in the present disclosure. Also, one or more processors 2210 having associated memory 2208 and timers 2212 may be provided for operating in concert with modem 2214 in a data communications environment, whereby PLC device 2200 may be configured to operate as a data communications device, e.g., a desktop computer, laptop computer, cellular phone, smart phone, or as a service node, data concentrator node, etc. Suitable AFE 2204 allows coupling of the device 2200 to a power line installation 2202, which may be part of example installation 102 shown in FIG. 1.

One of ordinary skill in the art will understand that the components of the power line communications systems described herein may be embodied as individual circuits or separate components, or as a single device that performs more than one of the illustrated operations. For example, in one embodiment, the transmitters and receivers described herein may be embodied as a microprocessor, central processing unit (CPU), integrated circuit (I/C), or application specific integrated circuit (ASIC), in conjunction with other circuitry. Software, firmware, or other embedded instructions may control the operation of the transmitter and receivers and cause the component to perform the functions described herein. Such devices may further perform the transmitter/receiver processing and MIMO frame signal generation, precoding, receiver processing and signal generation, power line coupling, signal combining, diversity distribution, channel or transmission matrix construction, S/P and P/S conversion, IFFT and FFT processing, CP addition and removal, OFDM (de)coding, CS selection and/or (re)configuration, and preamble detection, etc.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

Furthermore, in the above description, at least some terminology is used that is specifically defined in the NB-PLC standards such IEEE 1901.2, G2, etc. and/or is well understood by those of ordinary skill in the art in PLC technology. Definitions of these terms are not provided in the interest of brevity. Additionally, this terminology is used for convenience of explanation and should not be considered as limiting embodiments of the invention to the IEEE 1901.2 standard. One of ordinary skill in the art will appreciate that one or more of the disclosed embodiments may be practiced in conjunction with other standards, mutatis mutandis, without departing from the described functionality.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a non-transitory tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

Still further, in at least some additional or alternative implementations, the functions/acts described in the blocks may occur out of the order shown in the flowcharts. For example, two blocks shown in succession may be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be understood that the order or sequence of the acts, steps, functions, components or blocks illustrated in any of the flowcharts depicted in the drawing Figures of the present disclosure may be modified, altered, replaced, customized or otherwise rearranged within a particular flowchart or block diagram, including deletion or omission of a particular act, step, function, component or block. Moreover, the acts, steps, functions, components or blocks illustrated in a particular flowchart may be intermixed or otherwise inter-arranged or rearranged with the acts, steps, functions, components or blocks illustrated in another flowchart and/or block diagram in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A device comprising:
an input port configured to receive a PLC signal stream over a first pair of power lines of a power line communications (PLC) network, wherein the received PLC signal stream comprises a preamble, wherein the preamble has a known number K of symbols, and wherein K is an integer greater than or equal to 1; and
a detector coupled to the input port and configured to:
correlate the received PLC stream with a known preamble to generate a cross-correlation output profile;
determine a first estimate of the preamble start by:
placing a window of length equal to K symbols and divided into K symbol regions over the received PLC signal; and
adding one sample in the PLC signal stream to an end of the window and remove one sample in the PLC signal stream from a beginning of the window; and
determine a second estimate of the preamble start based on the cross-correlation output profile and further based on the first estimate of the preamble start.

2. The device of claim 1, wherein the known preamble is a legacy preamble according to a legacy PLC data transmission standard or a Multi-Input Multi-Output (MIMO) preamble.

3. The device of claim 1, wherein the input port is configured to receive a file control header (FCH).

4. The device of claim 1, wherein the received PLC signal stream comprises a Multi-Input Multi-Output (MIMO) frame received via an $[N_T \times N_R]$ MIMO channel in the PLC network, the MIMO frame including a legacy preamble portion, a Frame Control Header (FCH) portion including legacy FCH data and MIMO-compliant data, a MIMO-compliant preamble portion, and a payload data portion.

5. A method comprising:
receiving a power line communication (PLC) signal stream over a first pair of power lines of a PLC network, wherein the PLC signal stream comprises a preamble, wherein the preamble has a known number K of symbols, and wherein K is an integer greater than or equal to 1;
determining a first estimate of the preamble start by:
placing a window of length equal to K symbols and divided into K symbol regions over the received PLC signal stream; and
adding one sample in the PLC signal stream to an end of the window and removing one sample in the PLC signal stream from a beginning of the window;
correlating the received PLC signal stream with a known preamble to generate a cross-correlation output profile; and
determining a second estimate of the preamble start based on the cross-correlation output profile and further based on the first estimate of the preamble start.

6. The method of claim 5, wherein the preamble is a first Multi-Input Multi-Output (MIMO) preamble.

7. The method of claim 5, wherein the received PLC signal stream comprises a Multi-Input Multi-Output (MIMO) frame received via an $[N_T \times N_R]$ MIMO channel in the PLC network, the MIMO frame including a legacy preamble portion, a Frame Control Header (FCH) portion including legacy FCH data and MIMO-compliant data, a MIMO-compliant preamble portion, and a payload data portion.

8. The method of claim 5, wherein the preamble is used to provide channel estimation for decoding a file control header.

9. A device, comprising:
a detector configured to:
select a sliding window that spans a known number of SYNCP and SYNCM symbols;
move the sliding window over a power line communications (PLC) signal stream one sample at a time, the PLC signal stream received over a first pair of power lines of a PLC network;
calculate, for each window placement, a set of delayed correlations based on a select correlation order;

add absolute values of delayed correlations together to obtain a total correlation value for each window placement over the PLC signal stream;
apply a threshold against the total correlation values; and
select a sample index having maximum correlation as an initial estimate of a preamble start based on a maximization length parameter.

10. The detector of claim 9, wherein each of the SYNCP and SYNCM symbols is 256 samples long.

11. The detector of claim 9, wherein the PLC signal stream includes a preamble operative according to a legacy PLC data transmission standard.

12. The detector of claim 9, wherein the PLC signal stream comprises a preamble having 8 SYNCP symbols followed by a full SYNCM symbol and a half SYNCM symbol, each symbol including a plurality of OFDM samples.

13. The detector of claim 9, wherein the PLC signal stream comprises a Multi-Input Multi-Output (MIMO) frame received via an $[N_T \times N_R]$ MIMO channel in the PLC network, the MIMO frame including a legacy preamble portion, a Frame Control Header (FCH) portion including legacy FCH data and MIMO-compliant data, a MIMO-compliant preamble portion, and a payload data portion.

14. A method, comprising:
correlating a power line communications (PLC) signal stream with a preamble to generate a cross-correlation output profile, wherein the preamble has a known number K of symbols, K is an integer greater than or equal to 1, the PLC signal stream received over a first pair of power lines of a PLC network;
receiving a first estimate of the preamble start;
performing a correlation between the PLC signal stream with a delayed version of the PLC signal stream by:
placing a window of length equal to K symbols and divided into K symbol regions over the PLC signal stream, and
adding one sample in the PLC signal stream to an end of the window and removing one sample in the PLC signal stream from a beginning of the window; and
determining a second estimate of the preamble start based on the cross-correlation output profile and further based on the first estimate of the preamble start, wherein the first estimate of the preamble start is based on the correlation between the PLC signal stream with the delayed version of the PLC signal stream.

15. The method of claim 14, wherein the preamble is operative according to a legacy PLC data transmission standard.

16. The method of claim 14, wherein the preamble comprises 8 SYNCP symbols followed by a full SYNCM symbol and a half SYNCM symbol, each symbol including a plurality of OFDM samples.

17. The method of claim 14, wherein the PLC signal stream comprises a Multi-Input Multi-Output (MIMO) frame received via an $[N_T \times N_R]$ MIMO channel in the PLC network, the MIMO frame including a legacy preamble portion, a Frame Control Header (FCH) portion including legacy FCH data and MIMO-compliant data, a MIMO-compliant preamble portion, and a payload data portion.

* * * * *